United States Patent [19]

Okayama et al.

[11] Patent Number: 5,123,069
[45] Date of Patent: Jun. 16, 1992

[54] WAVEGUIDE-TYPE OPTICAL SWITCH

[75] Inventors: Hideaki Okayama; Issei Asabayashi; Toshimasa Ishida, all of Tokyo, Japan

[73] Assignee: OKI Electric Industry Co., Ltd., Tokyo, Japan

[21] Appl. No.: 725,827

[22] Filed: Jul. 3, 1991

Related U.S. Application Data

[63] Continuation of Ser. No. 604,115, Oct. 24, 1990, abandoned.

[30] Foreign Application Priority Data

Oct. 26, 1989 [JP] Japan .................................. 1-279555
Sep. 14, 1990 [JP] Japan .................................. 2-244766

[51] Int. Cl.$^5$ ............................................... G02B 6/10
[52] U.S. Cl. ........................................ 385/16; 385/40; 385/45; 385/132
[58] Field of Search ...................... 385/14, 16, 40, 45, 385/130, 132

[56] References Cited

U.S. PATENT DOCUMENTS

| | | | |
|---|---|---|---|
| 3,920,314 | 11/1975 | Yajima | 385/9 |
| 4,070,092 | 1/1978 | Burns | 385/45 |
| 4,116,530 | 9/1978 | Bellavance et al. | 385/130 |
| 4,693,544 | 9/1987 | Yamasaki | 385/47 |
| 4,730,884 | 3/1988 | Seino | 385/21 |
| 4,747,654 | 5/1988 | Yi-Yan | 385/37 |
| 4,810,049 | 3/1989 | Fischer et al. | 385/132 |
| 4,842,367 | 6/1989 | Djupsjöbacka | 385/41 |
| 4,852,958 | 8/1989 | Okuyama et al. | 385/17 |
| 4,906,062 | 3/1990 | Young | 385/130 |
| 4,940,305 | 7/1990 | Thaniyavarn | 385/16 |
| 4,961,619 | 10/1990 | Hernandez-Gil et al. | 385/132 |
| 4,984,861 | 1/1991 | Suchoski, Jr. et al. | 385/2 |
| 4,988,156 | 1/1991 | Shigihara | 385/130 |
| 5,016,960 | 5/1991 | Eichen et al. | 385/45 |

OTHER PUBLICATIONS

Papuchon et al., "Polarization Independent Switches in TiLiNbO$_3$, ... ", 5th Eur. Conf. Int. Optics pp. 244-247 (1989).

Sawa et al., "Design Considerations for Mode Conversion ... " Elect. and Comm. in Japan, vol. 72, No. 2, pp. 65-77 (1989).

Burns, "Voltage-Length Product for Modal Evolution ... " Nav. Research Lab, pp. 225-228 (1989).

"Electro-Optic Modulars May Be Easier to Make", Elect. Design, vol. 26, p. 160 (1978).

Sasaki, "Efficient Intensity Modulation in a TI-Diffused ... ", Elect. Lett., vol. 13, pp. 693-694 (1977).

Schienle et al., "GaInAsP/InP Zero-Gap Directional Couplers ... ", Elect. Lett., vol. 25, No. 17, pp. 1180-1181.

Baets et al., "Calculation of Radiation Loss ... ", Applied Optics, vol. 21, No. 11, pp. 1972-1978.

Primary Examiner—Brian Healy
Attorney, Agent, or Firm—Edward D. Manzo

[57] ABSTRACT

Waveguide-type optical switch comprising a substrate, branched first and second waveguide routes provided thereon, and an electrode(s) provided on the substrate for controlling the propagation-constant difference or refractive index difference between the first and second waveguide routes. The interval between the first and second waveguide routes is extended towards the terminal end sides from the branch point side of the waveguide routes. The first and second waveguide routes are provided with a branched part. The first and second waveguide routes are provided with at least one part of the bending portions (II) connected to the branch part, respectively. The local branch angle between the first and second waveguide routes on the side of starting ends of the bending portions (II) is enlarged while the local branch angle between the first and second waveguide routes on the side of terminal ends at the bending portions (II) is reduced.

42 Claims, 22 Drawing Sheets

FIG_2
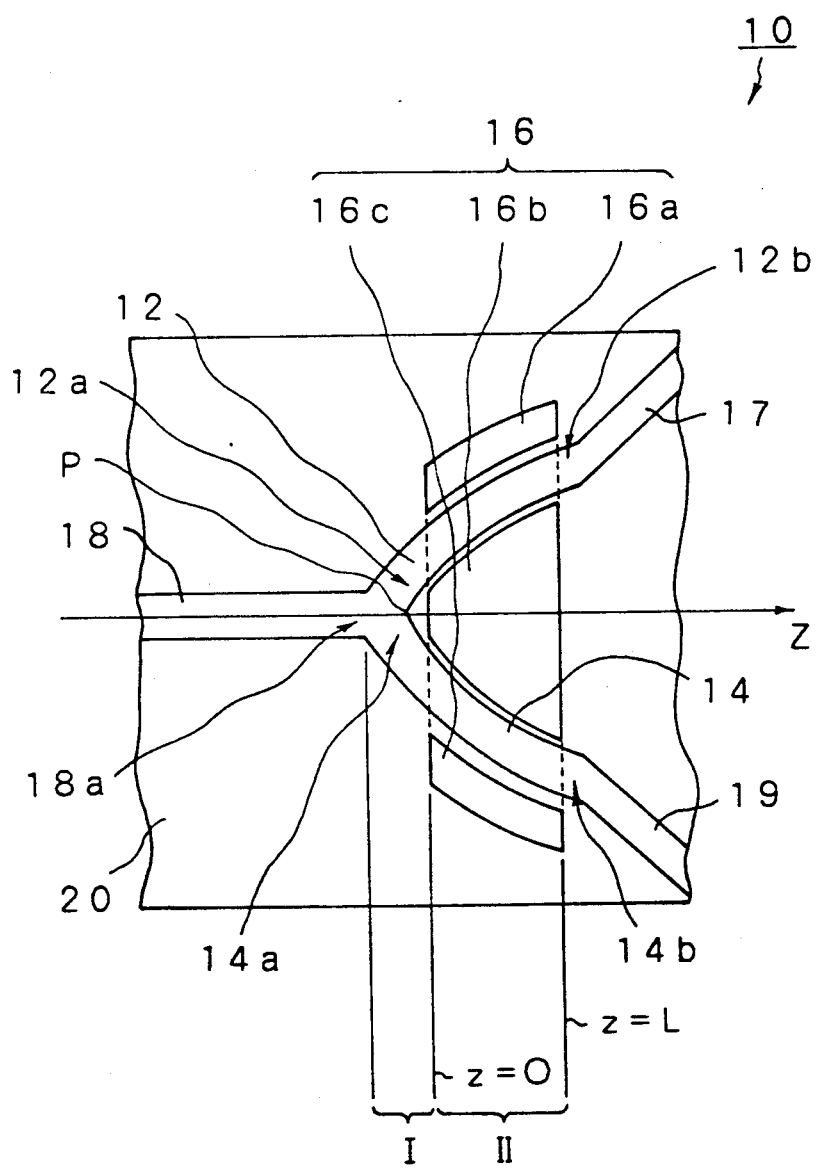

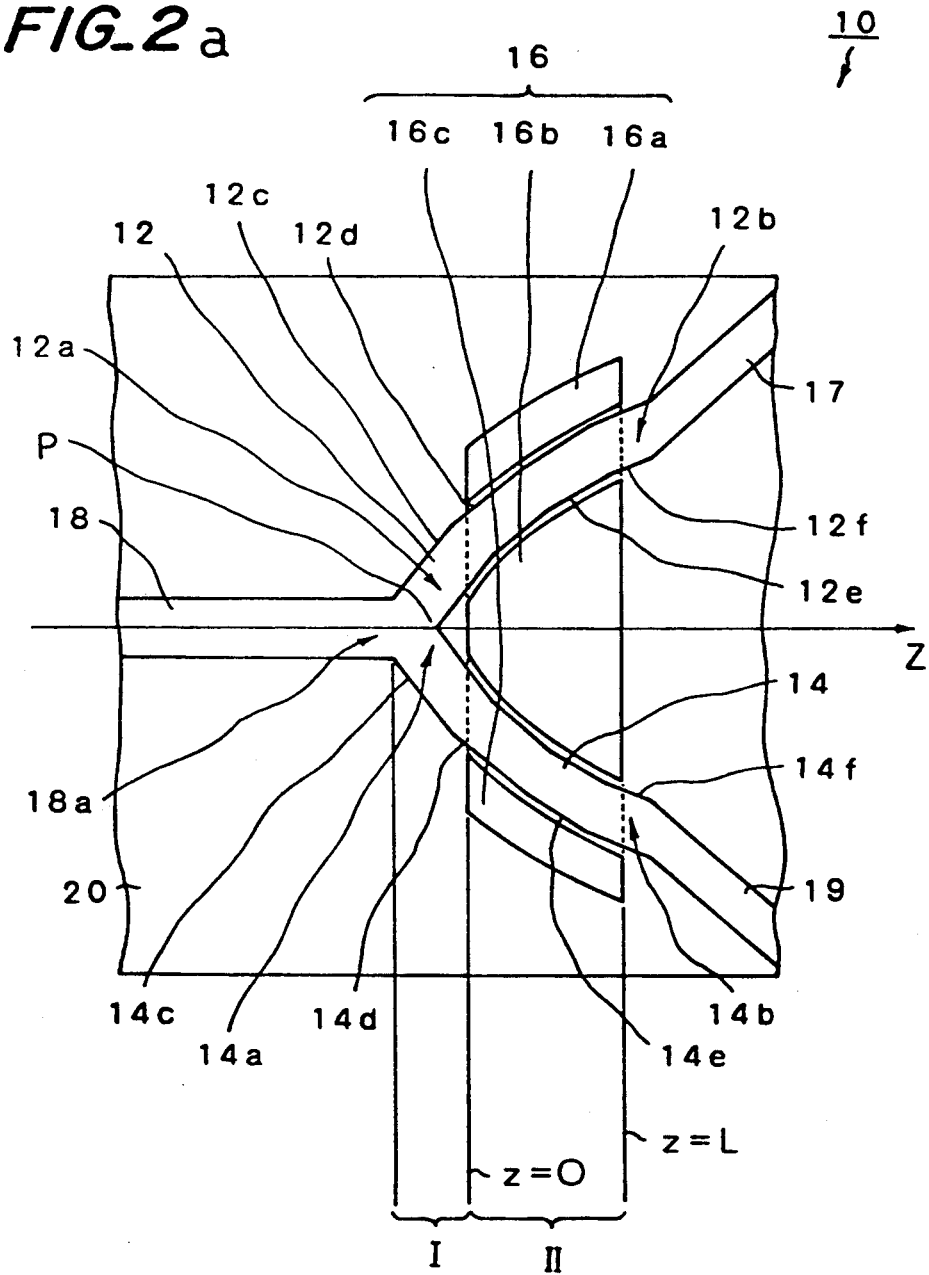
FIG_2a

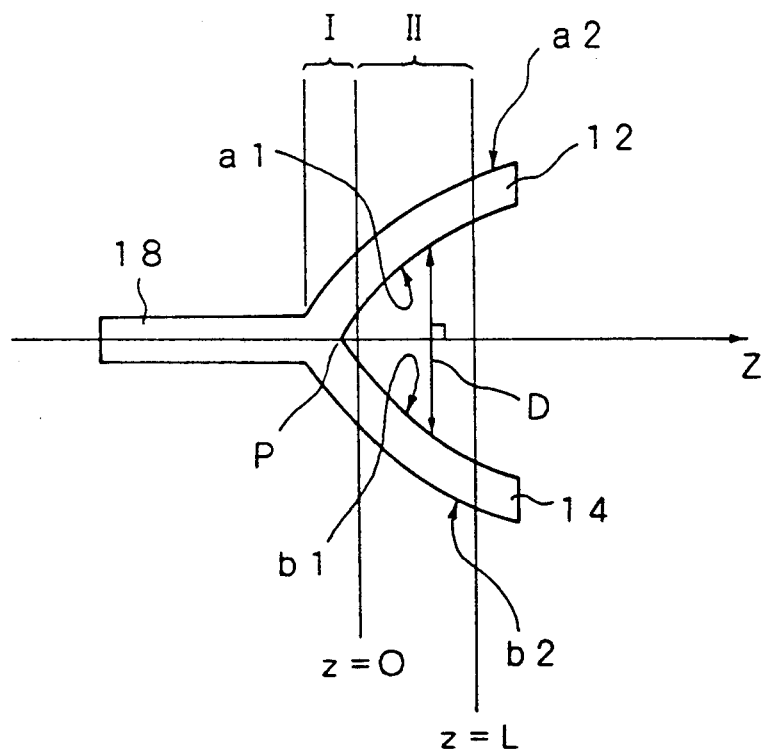
FIG_3

$y = 2 \log (X_0 e^\omega)$

FIG_5

"element length"/"coupling length"

"element length"/"coupling length"

FIG_7 A
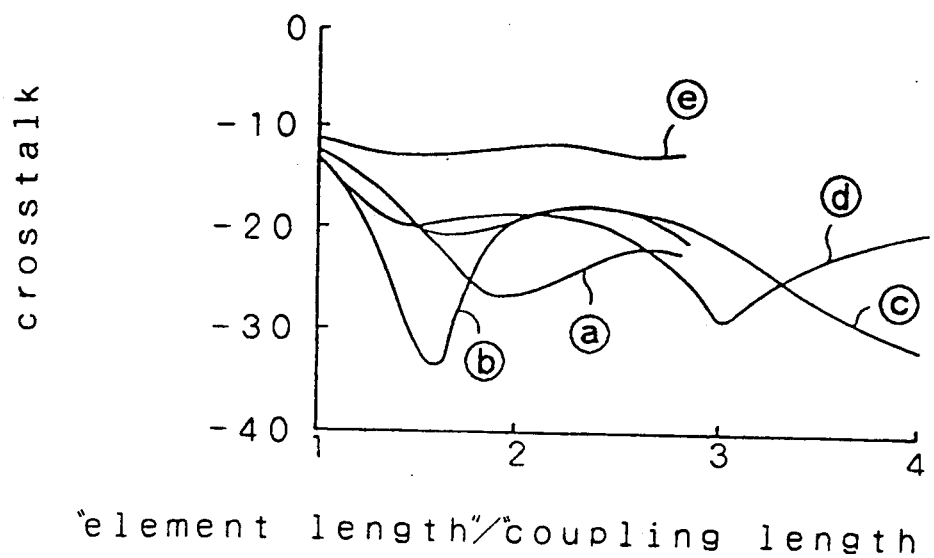
FIG_7 B
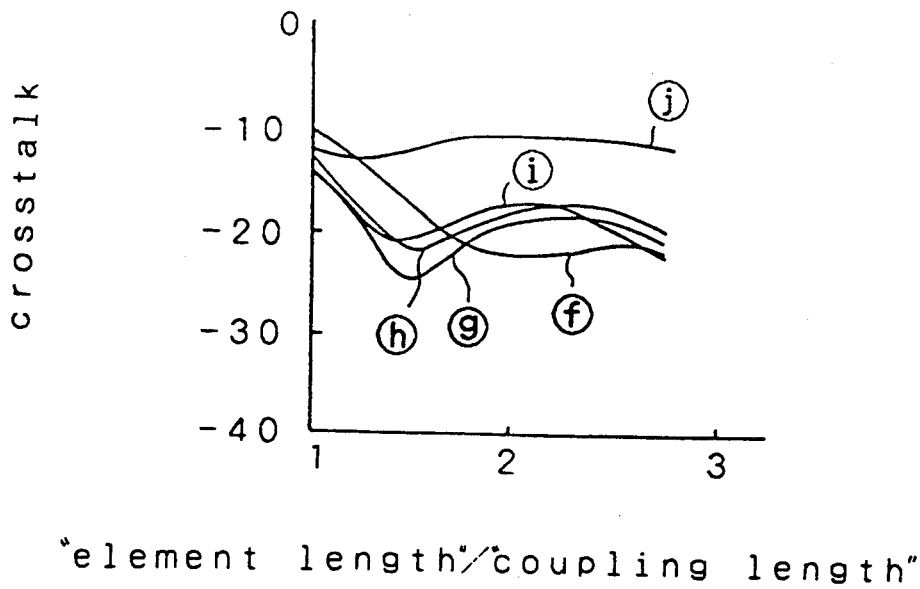

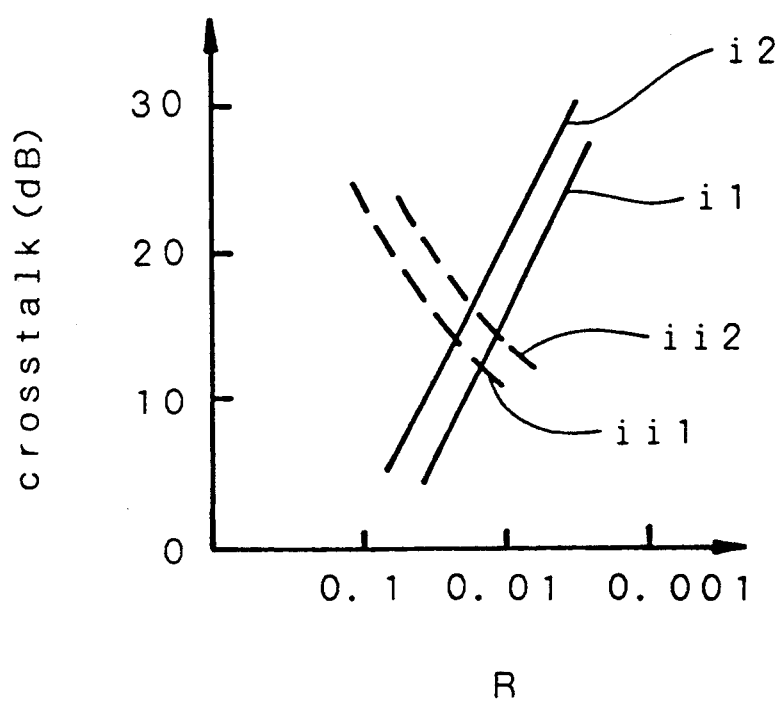
FIG_8

FIG_10

FIG_11

FIG_13

FIG_14

FIG_18
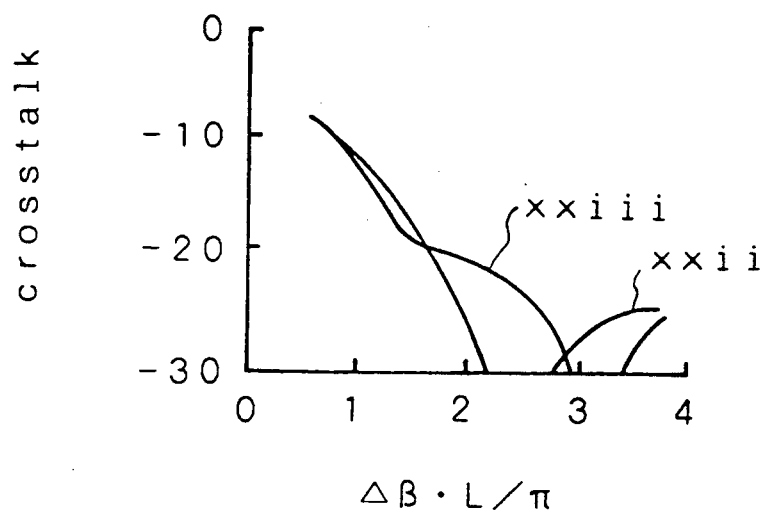
FIG_19
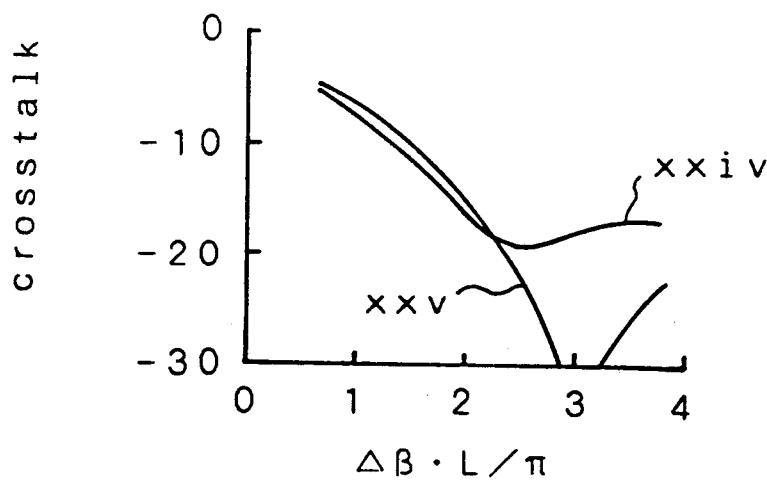

FIG_21

WAVEGUIDE-TYPE OPTICAL SWITCH

The following application is a continuation of Ser. No. 07/604,115, filed Oct. 24, 1990, now abandoned.

FIELD OF THE INVENTION

This invention relates to a waveguide-type optical switch which can perform optical output control digitally.

DESCRIPTION OF THE CONVENTIONAL TECHNIQUE

In recent years, a Y-branch type optical switch has been watched with keen interest because of its merit of easy use with digital ON/OFF operation under mild producing conditions. For instance, this type of optical switch is disclosed in Literature I: "Integrated and Guided-Wave Optics", *OSA* 1989 *Technical Digest Series*, Vol. 4 pp. 255–228, or Literature II: "IEEE Journal of Quantum Electronics, QE-16, 446 (1980). These optical switches are provided with the two waveguide routes forming the waveguide route system preserving the normal (or intrinsic) mode. By controlling the propagation-constant difference or refractive index difference between waveguide routes by setting the drive voltage at more than its given constant level, it is possible to achieve digital operation. In other words, an optical output can be emitted from the side and not the other side of two waveguide routes, or vice versa.

FIG. 1 shows a plan view of brief constitution of waveguide-type optical switch disclosed in Literature I. A waveguide-type optical switch 1 in FIG. 1 comprises waveguide-routes 2, 3 and 4 forming a Y-branch and electrode members 5a, 5b and 5c for branched waveguide routes 3 and 4. The waveguide routes and the electrode members are provided on a substrate 6. Waveguide routes 3 and 4 have linear shapes, and form the waveguide route system preserving the normal mode, respectively. Control is made for a propagation-constant difference or a refractive index difference between waveguide routes 3 and 4 through an electrode-optical effect caused by extending an electric field into these waveguide routes 3 and 4 by electrode members 5a, 5b and 5c. Such operation is briefly explained with one example. Here, the normal mode light of the waveguide route system forming the waveguide routes 3 and 4 shall be regarded as even mode rays. At this time, even mode rays or light L1 is excited or carried via waveguide route 2, and light L1 is input to the branch part of the waveguide routes 3 and 4. Then, a propagation-constant difference between waveguide routes 3 and 4 is controlled for elevating the refractive index of waveguide route 3 at one side more than that of waveguide route 4 at the other side. As a result, the optical power of the light L1 is concentrated to the final end of the waveguide route 3, and from this final end portion, even mode light L2 is output.

The conventional waveguide-type optical switch obtains the crosstalk characteristics suitable for practical uses by only specific voltage for two waveguide routes forming a waveguide-route system preserving the normal mode, and its waveguide route shape is made into specific form. For the experimental report on the optical switch in Literature II, refer to the Literature III: European Conference on Optical Communication '89, Lecture No. WeA13.

In the conventional optical switch in Literature I, two waveguide routes forming the above-mentioned waveguide route system are linear waveguide routes. Then, for obtaining practically full crosstalk characteristics with low operating voltage, it is necessary to elongate the device length (electrode-length) by reducing the crossing angle. Alternatively, one may elevate the operating voltage greatly for obtaining the practically full crosstalk characteristic in a switch having a short device length.

In a conventional optical switch in Literature II, the drive voltage is reduced by designing the waveguide route so as to obtain a crosstalk characteristic suitable for practical uses by only specific drive voltage. However, the deviation of drive voltage from its specific voltage results in no crosstalk characteristics suitable for practical use. Thus, there has been a problem of very narrow range of drive voltage obtaining the crosstalk characteristic suitable for practical use.

SUMMARY OF THE INVENTION

An object of the invention is to provide a waveguide-type optical switch which realizes a crosstalk characteristic suitable for practical use in a wider range of drive voltage than that of the conventional optical switch, and which realizes a crosstalk characteristic suitable for practical use with a lower drive voltage or by a shorter device length than those of the conventional optical switch, when comparing with a conventional type switch with the same device length or drive voltage.

An optical waveguide switching device according to the present invention, in various of its aspects, has first and second waveguide routes on a substrate. There is a branching angle between the routes. Also, the routes have a bending portion, a starting end where light may enter, and a terminal end from which light may pass. Electrodes are located proximate to the first and second waveguide routes to affect the light traveling from the starting end to the terminal end. The branching angle is enlarged at the starting end and reduces through the bending portion toward the terminal end, whereby crosstalk characteristics are improved at a lowered drive voltage of the electrodes.

The inventor, making two waveguide routes forming waveguide route system to be straight lined waveguide routes, examined changes in the value of a mode conversion index $\gamma$ concerning these two waveguide routes through numerical analysis. The analysis reveals that the value of index $\gamma$ is distributed like a hill between the branching portion and end of the two waveguide routes. It is also found that with an increase of the drive voltage, the position of the maximum value of index $\gamma$ is shifted from the side of the end portion to the side of the branching portion of the two waveguide routes, while the maximum value of the index $\gamma$ is reduced.

The index $\gamma$ represents a oriterion of the mode conversion size. It is estimated that mode conversion is increased in places where the value of the index $\gamma$ is large, whereas it is reduced where the value of index $\gamma$ is small. Thus, the increase of the maximum value of the index $\gamma$ is thought to mean that the crosstalk characteristics are improved with increase of the drive voltage. The waveguide-type optical switch can be used in practice so long as its crosstalk characteristic is reaching a standard value, for instance $-15$ to $-20$ dB. Therefore, the maximum value of the index $\gamma$ shifted to the side of the branching portion can be increased without any practical problem up to that standard level.

According to the invention, each of the two waveguide routes is provided with a local bending portion, and the local branch angle between the two waveguide routes is increased on the side of the starting end of the bending portion while it is reduced on the side of the terminating end. When the local branch angle is increased, the maximum value of the index $\gamma$ in the portion where the local branch angle is increased is also increased. However, as will be understood from the above, it can be thought that practically suitable crosstalk characteristics are obtainable even by increasing the maximum value of index $\gamma$ up to a certain value.

Besides, by the provision of the bending portions the following effects or advantages (i) and (ii) can be achieved simultaneously.

(i) With a conventional drive voltage, crosstalk characteristics suitable for practical uses can be realized at shorter device lengths than heretofore. Also, with a conventional device length, crosstalk characteristics suitable for practical uses can be realized by lower drive voltage than heretofore.

(ii) Crosstalk characteristics suitable for practical uses can be realized in a wider range of drive voltage than heretofore.

In a preferred mode of the invention, the local branch angle at the bending portion is gradually reduced toward the terminal end/edge from the starting end of the bending portion.

In another preferred mode of the invention, the bending portion shows the plane form of the bending shape bending smoothly. Alternatively, the bending portion shows the plane form of the folded line shape folded in multiple stages.

In a further preferred mode of the invention, the bending portion of the first and second waveguide routes forms the waveguide route system preserving the normal mode between a terminal end of each branch part and the terminal end of the bending portion.

In a further preferred mode of the invention, the branch part of the first and second waveguide routes is the area part equally dividing the optical power of normal mode into these first and second waveguide routes. Each bending portion of the first and second waveguide routes is the area part concentrating the equally divided normal mode optical power to either the first or the second waveguide route.

In a further preferred mode of the invention, each bending portion of the first and second waveguide routes is the area part as opposed to the electrodes.

In a further preferred mode of the invention, the electrode(s) are provided with first, second and third electrode members;

the first electrode member is located beside first waveguide route on the side thereof more remote from the second waveguide route;

the second electrode member is located between the first and second waveguide routes; and the third electrode member is located beside the second waveguide route on the side thereof more remote from the first waveguide route.

In a further preferred mode of the invention, the center line of the first waveguide route is symmetrical with the center line of the second waveguide route with respect to a straight axis.

Preferably, the branch part is symmetric with respect to the straight axis.

Preferably, the starting ends of the first, second and third electrode members and of the bending portions lie on the same corresponding position on the straight axis, and the terminal ends of the first, second and third electrode members and of the bending portion lie on the same corresponding position on the straight axis.

In a further preferred mode of the invention, the bending portions of the first and second waveguide routes are separated from each other by such a distance that when a voltage(s) is input to the electrode(s) to operate the optical switch, under the state inputting the voltage, optical strength distribution (or field distribution) may exist at the terminal end part of either one of the bending portions of the first and second waveguide routes and may not exist at the other bending portion.

In a further preferred mode of the invention, the following formula is established when the specified (normalized) interval between the inside edge of the first waveguide route and the inside edge of the second waveguide route is expressed as "$\omega$", and the distance in the positive direction to the bending side from the branch side along the straight axis is expressed as Z, then $\omega = S(D - D_0)$, where S is a parameter showing the optical amount emitted from the first and second waveguide routes and naturally determined by the sectional shape of their waveguide routes;

D is the distance (measured normal to the Z-axis) between inside edges of the first and second waveguide routes;

$D_0$ is the distance of D at the starting end of the bending portion; and each specified local branch angle $d\omega/dZ$ of the inside edges is $d\omega/dZ = S \cdot dD/dZ$.

In a further preferred mode of the invention, the following formula can be established when the distance in the positive direction on the bending side from the branch side along the straight axis is expressed as Z, the starting end of the bending portion is expressed as $Z=0$, the terminal end of the bending portion is expressed as $Z=L$, and a specified (normalized) interval between the opposed inside edges of the first and second waveguide routes is expressed as "$\omega$", then $\omega = \alpha \cdot (Z+Z_0)^n$ where $\alpha$ and n are parameters indicating the plane shape of the first and second waveguide routes and positive, and $0<n<1$;

$Z_0$ is a parameter indicating the maximum local branch angle; and each specified local branch angle $d\omega/dZ$ of the inside edges is given as $d\omega/dZ = n \cdot \alpha (Z+Z_0)^{n-1}$.

In a further preferred mode of the invention, the following relation is established at $Z=0$: $0 < d\omega/dZ < \pi/90$.

In a further preferred mode of the invention, the following formula is established:

$$\frac{2 \cdot K(Z)}{d\omega/dZ} > 0.43$$

where $K(Z)$ is a coupling coefficient between the first and second waveguide routes at a position Z.

In a further preferred mode of the invention, the waveguide-type optical switch may have a Y-branched type waveguide route structure comprising an input side waveguide route and first and second waveguide routes branched therefrom.

In a further preferred mode of the invention, the waveguide-type optical switch may also have an X-branched type waveguide route structure comprising one straight advancing waveguide route and another straight advancing waveguide route; wherein the one straight advancing waveguide route is provided with the second input-side (or incidence) waveguide route and the second waveguide route; and wherein the other straight advancing waveguide route is provided with the first input-side (incidence) waveguide route and the first waveguide route.

In a further preferred mode of the invention, the first input-side (or incidence) waveguide route has a thinner width than that of the second input-side (or incidence) waveguide route.

In a further preferred mode of the invention, the electrode length is expressed as L, the specified distance specified by the electrode length L for the distance measured from the starting end of the bending portion toward the terminal end side thereof along an axis is expressed as $\tau$, with respect to which axis a center line of the first waveguide route is symmetrical with a center line of the second waveguide route, the local branch angle in a zone of the bending portion is maximum at $\tau=0$ and gradually becomes small from $\tau=0$ towards $\tau=r$ ($0<r<1$), and the local branch angle from $\tau=r$ to $\tau=1$ is smaller than the local branch angle at around $\tau=0$.

In a further preferred mode of the invention, the bending portion of each of the first and second waveguide routes comprises a curved waveguide route part ($0<\tau\leq r$) and a straight waveguide route part ($r<\tau\leq 1$).

In a preferred mode of the invention, the local branch angle at the straight waveguide route part ($r<\tau\leq 1$) is that of the curved waveguide route part ($0<\tau\leq r$) of the bending portion at $\tau=r$.

In a further preferred mode of the invention, the following formula can be established:

$$\omega = \ln[(R^{-1}-1)\cdot\tau + 1]$$

$$0\leq\tau\leq 1$$

where $\omega$ is a specified (normalized) interval between the inside edges as opposed mutually with the first and second waveguide routes, ln is the natural logarithm and R is the min/max coupling coefficient ratio between the first and second waveguide routes.

In a further preferred mode of the invention, each of the bending portions of the first and second waveguide routes has a form such that the distance D between the inside edges of the waveguide routes measured in the direction normal to the $\tau$-axis increases or enlarges in a logarithmic function with an increase of $\tau$.

In a further preferred mode of the invention, each of the bending portions of the first and second waveguide routes has a logarithmic type waveguide route shape in a zone from $\tau=0$ to $\tau=r$ ($0<r<1$), and a straight type waveguide route shape in a zone from $\tau=r$ to $\tau=1$.

In a further preferred mode of the invention, the shape of the first and second waveguide routes is made to be an intermediate waveguide route form between the straight type waveguide route and a logarithmic type waveguide route.

In a further preferred mode of the invention, the curve form of the first and second waveguide routes is expressed as $$\omega = \ln[(R^{-1}-1)f(\tau)+1]$$

whereas $$f(\tau) = \{\exp[(-\ln R)\,e\tau]-1\}/\{\exp[(-\ln R)\,e]-1\}$$

$$0\leq e\leq 1,$$

$$\tau = Z/L$$

where
- $\omega$ is specified (normalized) interval between the inside edges of the first and second waveguide routes;
- Z is a distance measured from the starting end of the bending portion toward the terminal end side thereof along an axis, with respect to which the center line of the first waveguide route is symmetrical with the center line of the second waveguide route;
- L is the length of the electrode(s);
- R is a min/max coupling coefficient ratio between the first and second waveguide routes; and
- e is a parameter determining the curve form.

In a further preferred mode of the invention, the curve form of the first and second waveguide routes is expressed as $$\omega = \ln(R^{-1})\{\ln[R^{-1}-1)e\tau+1]\}/\{\ln[(R^{-1}-1)e+1]\}$$

whereas, $$0\leq e\leq 1,$$

$$\tau = Z/L$$

where
- $\omega$ is a specified (normalized) interval between the inside edges of the first and second waveguide routes;
- Z is a distance measured from the starting end of the bending portion toward the terminal end side thereof along an axis, with respect to which the center line of the first waveguide route is symmetrical with the center line of the second waveguide route;
- L is the length of the electrode(s);
- R is a min/max coupling coefficient ratio between first and second waveguide routes; and
- e is a parameter determining the curve form.

In a further preferred mode of the invention, R is $0.003<R<0.03$ when it is regarded as min/max coupling coefficient ratio between the first and second waveguide routes.

In a further preferred mode of the invention, the width of the first waveguide route is the same as that of the second waveguide route.

In a further preferred mode of the invention, the waveguide-type optical switch may also have a x-branched waveguide route structure comprising one waveguide route and another waveguide route;

wherein the one waveguide route comprises first input-side (or incidence) waveguide route and the first waveguide route is connected thereto;

wherein the other waveguide route comprises second input-side (or incidence) waveguide route and the second waveguide route is connected thereto;

wherein the width of the first input-side waveguide route is wider than the width of the second input-side waveguide route; and wherein the one and the other waveguide routes are mutually separated over whole length thereof and proximate at respective connected parts.

BRIEF DESCRIPTION OF THE DRAWINGS

The foregoing and other objects and advantages of the present invention will be seen by reference to the following description, taken in connection with the accompanying drawings, in which:

FIG. 2 is a fragmentary plan view schematically showing a first embodiment of the invention;

FIG. 2a is a fragmentary plan view schematically showing a first embodiment of the invention with a multi-stage-bending linear shape. FIG. 3 is a view for explaining the waveguide route shape in the first embodiment;

FIGS. 7A and 7B are views showing crosstalk characteristics of the first embodiment;

FIG. 8 is a view showing an example of the result of analysis for optimizing the min/max coupling coefficient ratio R;

FIGS. 17A to 17B and 18 are views showing crosstalk characteristics of the fourth embodiment;

FIG. 19 is a view showing an example of crosstalk characteristics when the waveguide route portion from $\tau=0$ to $\tau=1$ is a straight waveguide route;

DETAILED DESCRIPTION OF PREFERRED EMBODIMENTS

Figure 1:
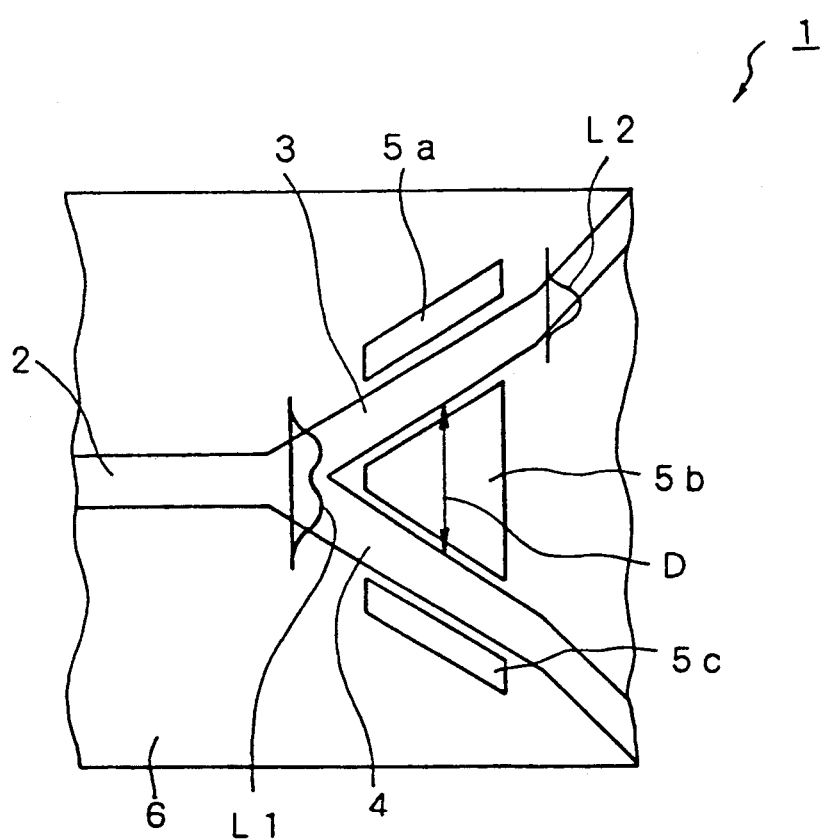
FIG. 1 is a plan view schematically showing the construction of a conventional waveguide-type optical switch.

Preferred embodiments of the invention will be described with reference to the drawings. The drawings provide only schematic illustrations such as to permit understanding of the invention, and therefore, the shapes, sizes and arrangement of individual components are by no means limitative.

FIRST EMBODIMENT

FIG. 2 shows the plan view sketch of a first embodiment of this invention. This embodiment concerns an optical switch having a waveguide route of the Y-branch type.

As shown in this diagram, waveguide-type optical switch 10 of the first embodiment has a substrate 20, upon which two waveguide routes 12 and 14 branch from an input waveguide route 18. An electrode 16 on substrate 20 controls the propagation-constant difference or refractive index difference between the two waveguide routes 12 and 14. With reference also to FIG. 3, the interval D between the two waveguide routes 12 and 14 expands a branch portion I of waveguide routes 12 and 14 towards the final end portions 12b and 14b, as shown in FIG. 2. In the following description, the axis Z is considered, with respect to which center lines of waveguide routes 12 and 14 (i.e., lines connecting center points of waveguide routes in the width direction thereof) are symmetric with each other, and a direction from the light incidence (input) side to the emission (output) side (i.e., from left to right in the Figure) is taken as the plus direction of the Z axis.

A partial bending portion II is provided at each of the two waveguide routes 12 and 14, and the local branch angle (or opening angle) is enlarged for the waveguide routes 12 and 14 at the starting end (z=0) of the bending portion II, also, the local branch angle is reduced for waveguide routes 12 and 14 on the side of the finishing end (Z=L) at the bending portion II.

Thus, it will be seen in FIGS. 2 and 3 that the angle between the two branches 12 and 14 starts at some value where routes 12 and 14 meet, and then decreases continuously within region II, up to an axial position where Z=L, or even some position beyond Z=L.

The local branch angle at the bending portion II of waveguide routes 12 and 14 is reduced gradually up to the finishing end (Z=L) from the starting end (Z=0) so that the waveguide route shape at the bending portion II has a smoothly bending form.

The waveguide route shape at the bending portion II, however, may take a multi-stage-bending linear shape. FIG. 2a shows the plan view sketch of this multi-stage-bending linear shape. The bending portion II comprises a plurality of straight waveguide route members 12c, 12d, 12e, 12f, 14c, 14d, 14e, 14f. Each member is coupled sequentially to the next member.

In a more detailed explanation, the waveguide-type optical switch 10 of this first embodiment is provided with first and second waveguide routes 12 and 14, the light incidence (input) side waveguide route 18 forming the Y-branch, and electrode 16 provided for branched first and second waveguide routes 12 and 14.

The Y-branch is formed by connecting an end part 18a of the light incidence side waveguide route 18 with an end part 14a of the second waveguide route 14 and with an end part 12a of the first waveguide route 12. These waveguide routes 18, 12 and 14 are provided on the substrate 20. The opposite end parts 12b and 14b usually have their ends connected to linear waveguide routes 17 and 19 and used for connection of optical fibers or the like, which are not shown.

The electrode 16 includes electrode members 16a, 16b and 16c. The electrode member 16a is located beside first waveguide route 12 on the "outside" (the side thereof more remote from the second waveguide route 14). The electrode member 16b is located between first and second waveguide routes 12 and 14. Also, the electrode member 16c is located beside the second waveguide route 14 on the other "outside" (the side thereof more remote from the first waveguide route 12), and electrode members 16a, 16b and 16c are positioned on the substrate 20. Each electrode of FIG. 2 has two curved outside edges and two straight edges. The straight edges are set at Z=0 and at Z=L so that the electrodes extend throughout or along bending portion II.

The two waveguide routes 12 and 14 preserve or hold the normal mode (or intrinsic mode) between the starting end (Z=0) of the branch part I and the finishing end (Z=L) of the bending portion II. Therefore, this waveguide-route system is provided with at least two waveguide routes 12 and 14 with a branch part I and bending portion II.

The branch part I is a portion for equal division of optical power of normal mode in this waveguide route system into two waveguide routes 12 and 14. It has the linear symmetric shape on the Z-axis as mentioned later for equal division of the optical power.

The finishing end part (the part at Z=L and its nearby waveguide route part) of the bending portion II of the two waveguide routes 12 and 14 is a portion for concentrating the optical power of normal mode in the waveguide route system into either one of two waveguide routes 12 and 14.

The finishing end parts of the bending portion II of two waveguide routes 12 and 14 are separated from each other at such a distance that when voltage is applied to the electrode 16, a field distribution (or optical power strength distribution) of normal mode can exist at the finishing end of the bending portion II of one of waveguide routes 12 and 14, whereas it cannot exist at the finishing end part of bending portion II of the other waveguide route. As seen in FIG. 2, for Z>L the separation between waveguide routes is as wide or wider than the separation at Z=L. Therefore, when optical power is concentrated to the one of the electrode-finishing end parts by applying voltage to the electrode 16, an optical output can be emitted from one of the waveguide routes with an optic power ratio equal to that at the electrode-terminal end of the waveguide routes 12 and 14. The part of waveguide routes 12 and 14 where Z>L may be omitted.

For instance, by applying voltage to the electrode 16, when setting the ratio of optical power at a portion of waveguide route 12 corresponding to the finishing end (terminal end) of the electrode and that of waveguide route 14 as 1:0 or 0:1, it is possible to set the optical power ratio output from the finishing ends 12b and 14b of waveguide routes 12 and 14 as 1:0 or 0:1, thus, ideal digital operation can occur.

Next, a description is given of the shape of the bending portion obtained by numerical analysis.

FIG. 3 shows a schematic plan view of the shape of the waveguide route of waveguide type optical switch of the first embodiment.

In this diagram, the Z-axis passing the branch point P of waveguide routes 12 and 14 is set on the substrate 20, and the optical propagating distance Z in the Z-axial direction from the start position (Z=0) at the bending portion I is taken on the Z-axis. Also, line D shows the distance between an inside edge a1 of waveguide 12 and an inside edge b1 in a direction along the surface of the substrate 20. Line D is perpendicular to the Z-axis. The distance D is an interval between waveguide routes. The inside edge a1 of route 12 faces waveguide route 14 and the inside edge b1 of waveguide route 14 faces route 12.

The optical ratio f of the first and second waveguide routes 12 and 14 can be expressed quantitatively by the following formula (1). (See Literature II.)

$$f = -X + (X^2 + 1)^{\frac{1}{2}} \tag{1}$$

where $X = \Delta\beta/(2 \cdot K)$, and K is a coupling coefficient between the waveguide routes, and $\Delta\beta$ is a propagation constant difference between waveguide routes.

At Z=0 of waveguide routes 12 and 14, if f→1, so that optical power is equally divided, then, x→0 by the formula (1). When f→0 at Z=L of waveguide routes 12 and 14, so that the optical power is concentrated in one of the waveguide routes, and field distribution of normal mode exists at that waveguide route alone, then X→∞ by formula (1).

By changing either the connecting coupling coefficient K or the propagation-constant difference $\Delta\beta$, X→∞ or X→0 can be obtained. The propagation-constant difference $\Delta\beta$ is changed in conformity with the voltage input to the electrode 16, and the coupling coefficient K is changed with the interval D between the first and second waveguide routes. Thus, for reducing the drive voltage, it is more beneficial to make X→∞ by reducing the coupling coefficient K rather than to make X→∞ by enlarging the propagation-constant difference $\Delta\beta$.

Accordingly, when considering the concentration or equal division of optical power by changing the coupling coefficient K, X→0 and f→1 can be obtained by K→∞ at Z=0 of waveguide routes 12 and 14, and K→0 at at Z=L waveguide routes 12 and 14 results in X→∞ in case of $\Delta\beta > 0$, then, f→1/(2X)→0 can be obtained (while $\Delta\beta > 0$ will result in f→∞).

As in the above, waveguide routes 12 and 14 should be formed in such a manner that X can change in a range from X=0 to X=∞ at the zone from Z=0 to Z=L of waveguide routes 12 and 14. Moreover, for selective optical output from either one of waveguide routes 12 and 14, it is necessary to widen the interval D between waveguide routes on the side of Z=L of waveguide routes 12 and 14 and to narrow the interval D on the side of Z=0 of waveguide routes 12 and 14. D is an interval between opposing inside edges of the waveguides measured in a direction perpendicular to the Z-axis.

Therefore, the interval D between the waveguide routes should be widened while changing from X=0 to X=∞ at the zone from Z=0 to Z=L, but in this case, for obtaining a crosstalk characteristic suited for practical use, normal mode conversion should be suppressed as low as possible. Thus, it is necessary to preserve the normal mode in the waveguide route system of waveguide routes 12 and 14. Here, index "γ" shows the mode-conversion rate of the normal mode or the intrinsic mode. It is estimated that a large index "γ" induces the mode conversion of the normal mode, and a small index "γ" may reduce the mode-conversion of the normal mode.

Then, in considering the index "γ" as the conversion rate of the normal mode, index "γ" can be expressed by the following formula (2).

$$\gamma = \frac{1}{2 \cdot \Delta\beta \cdot (X^2 + 1)^{3/2}} \cdot \frac{dX}{dZ} \tag{2}$$

See Literature II

Recalling that $X = \Delta\beta/(2 \cdot K)$ as defined in formula (1), and noting that the coupling coefficient K can be expressed by the following formula (3), a formula (4) can be obtained by setting normalized waveguide interval $\omega = S \cdot (D - D_0)$.

$$K = K_0 \cdot \exp\{-S \cdot (D - D_0)\} \tag{3}$$

In these equations, $K_0$ is a coupling coefficient between waveguide routes at $Z = 0$, and S is a constant (parameter showing the light or ray-exuding amount from the waveguide route and is determined depending on the shape of waveguide) for stipulating the reducing rate of the coupling coefficient. These $K_0$ and S values can be set optically with designs. $D_0$ is the interval between the waveguides at $Z = 0$.

$$\begin{aligned} X &= \{\Delta\beta/(2 \cdot K_0)\} \cdot \exp \omega \\ &= X_0 \cdot \exp \omega \end{aligned} \tag{4}$$

wherein $X_0$ shows X at the position of $Z = 0$.

Accordingly, the formula (2) can be changed to show the following formula (5) by using the formula (4)

$$\gamma = \frac{1}{2 \cdot \Delta\beta} \cdot \frac{X^2}{(X^2 + 1)^{3/2}} \cdot \frac{d\omega}{dZ} = \frac{1}{2 \cdot \Delta\beta} \cdot F \cdot \frac{d\omega}{dZ} \tag{5}$$

where, $$F = \frac{X^2}{(X^2 + 1)^{3/2}} \tag{6}$$

wherein $d\omega/dZ$ shows the open angle in radians specified by the reducing rate S for the open angle $dD/dZ$ of the waveguide routes 12 and 14. The expression $d\omega/dZ$ is used as a normalized local branch angle (or normalized opening angle).

Figure 4:
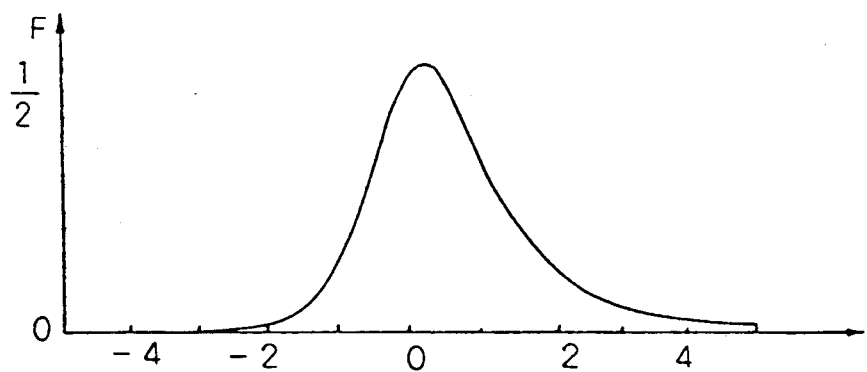
FIG. 4 is a view showing the relation between parameters F and y.

Here, with $X^2 = 10^y$, F is expressed by the function of y, then relationships as shown in FIG. 4 can be obtained on F and y.

In FIG. 4, the abscissa is shown by $y = 2\log(X_0 \cdot e^\omega)$, and F is taken to show the ordinate.

As shown in FIG. 4, F has a maximum at about $y = 0.14$. When F is maximum, $X \approx 1.2$ and $\omega = \ln(1.2/X_0)$, and the index "γ" has a maximum. At the zones from $Z = 0$ to $Z = L$ of waveguide routes 12 and 14, for obtaining the crosstalk characteristics suitable for practical use by reducing the mode conversion, the index "γ" shall be reduced at this "ω" approximately.

Here, if ω is given in the expression $\omega = \alpha \cdot (Z + Z_0)^n$, the following formula (7) can be obtained with $X = 1.2$. In formula (7), α and n are parameters indicating the shape (or curve) of waveguide route and have positive values.

$$\gamma_{max} \approx \frac{1}{4 \cdot \Delta\beta} \cdot n \cdot \omega_m \cdot \sqrt[n]{\frac{\alpha}{\omega_m}} \tag{7}$$

We let $\gamma_{max}$ and $\omega_m$ show values of γ and ω when the index "γ" becomes its maximum, respectively.

By the way, when the element length (electrode length) measured in the Z direction is L, $\omega = \alpha \cdot L^n$ at an element terminal ($Z = L$), and the following formula (8) can be obtained.

$$X = X_0 \cdot \exp(\alpha \cdot L^n) = X_e \tag{8}$$

Accordingly, α can be expressed in the next formula (9).

$$\begin{aligned} \alpha &= \frac{1}{L^n} \cdot \ln\frac{X_e}{X_0} \\ &= \frac{1}{L^n} \cdot \ln\frac{K_0}{K_e} \\ &= \frac{1}{L^n} \cdot \{\ln(X_e/1.2) + \omega_m\} \end{aligned} \tag{9}$$

Then, by the formulae (7) and (9), the following formula (10) can be obtained.

$$\gamma_{max} \approx \frac{1}{4 \cdot \Delta\beta \cdot L} \cdot n \cdot \omega_m \cdot \sqrt[n]{\frac{\ln(X_e/X_0)}{\omega_m}} \tag{10}$$

Now, $\omega_m$ can be expressed as in the following formula (11).

$$\omega_m = \ln\frac{X_e}{X_0} - \ln\frac{X_e}{1.2} \tag{11}$$

When $X = X_0 \to 0$ at $Z = 0$, and $X = X_e \to \infty$ is at $Z = L$, $$\ln\frac{X_e}{X_0} >> \ln\frac{X_e}{1.2}$$

can be obtained.

Accordingly, with formulae (1) and (11), the following formula (12) can be obtained.

$$\gamma_{max} \to \frac{1}{4 \cdot \Delta\beta \cdot L} \cdot n \cdot \ln\frac{X_e}{X_0} \tag{12}$$

Accordingly, it is understood that n shall be smaller for making $\gamma_{max}$ smaller. In order to hold the normal mode and reduce crosstalk, it is better to set n in the range of $0 < n < 1$.

Then, in this embodiment, inside edges (a1 and b1) of waveguide routes 12 and 14 are formed in such a way that the specified or normalized local branch angle $d\omega/dZ$ shall be $d\omega/dZ = n \cdot \alpha \cdot (Z + Z_0)^{n-1}$, $0 < n < 1$. Here α and $Z_0$ constants set suitably for design. Outside edge a2 of waveguide route 12 shall be set in parallel with the inside edge a1, and outside edge b2 of waveguide route 14 shall be set in parallel with the inside edge b1. Also $0 < d\omega/dZ < \pi/90$ shall be preferable at $Z = 0$. Also, in equation (12), $Z_0$ is a parameter for designating the maximum local branch angle ($d\omega/dZ$ at $Z=0$). It is $Z_0 \approx 0$ and thought to have no influence on the above analysis.

In order for the waveguide routes 12 and 14 to form a waveguide system having a normal mode (or intrinsic mode), it is desired to satisfy the following equation between $Z=0$ and $Z=L$.

$$\frac{2 \cdot K(Z)}{d\omega/dZ} > 0.43$$

where $K(z)$ shows the coupling coefficient at the position of distance (z).

Figure 5:
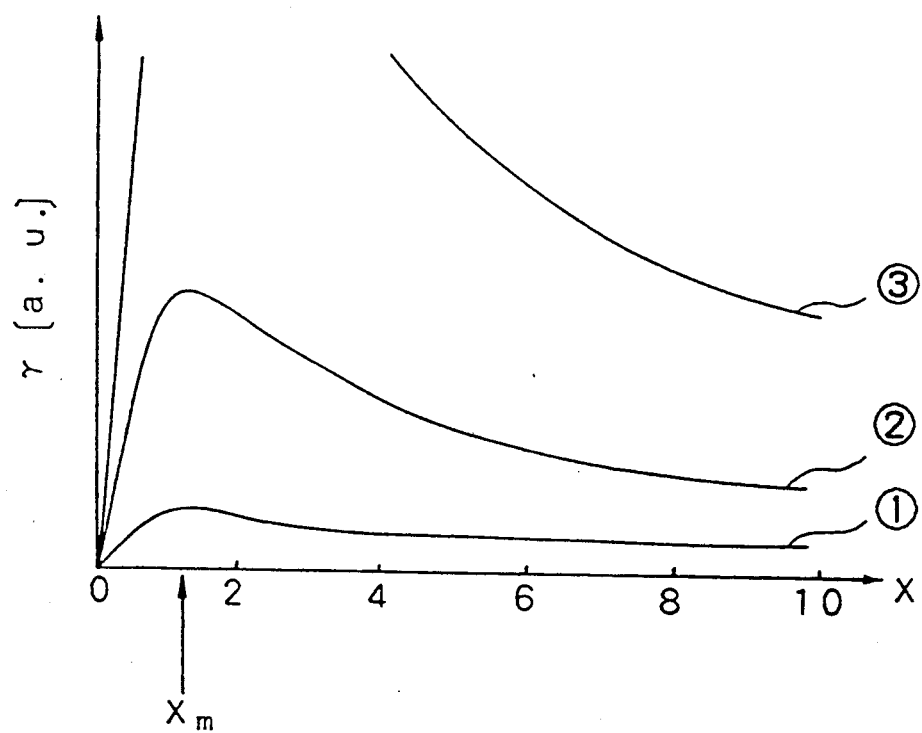
FIG. 5 is a view showing the manner of changes in the index $\gamma$ of mode conversion with respect to parameter n.

FIG. 5 shows the manner of change of index "Y" against n in case of $X=10^{-4}$ as $X=\Delta\beta/(2\cdot K)$ noted above. In FIG. 5, index "$\gamma$" was taken for the ordinate, and X was taken for the abscissa. Relations between "$\gamma$" and X shall be expressed by curves ①, ②, and ③ when $n=0.5$, 1 and 2.

As understood from these curves ①-③, a smaller n-value will induce less index "$\gamma$", and the position of X (shown by $X_m$ in the diagram) to make "$\gamma$" maximum becomes nearly 1.2. Thus, there is no big change against the change of the value of n, thereby, it is understood that the above approximate analysis is permitted.

In the conventional element in Literature II, the conversion of normal mode of $Y=1/(2\cdot\Delta\beta\cdot L)$ was extended over the whole element. While in this embodiment, $\gamma_{max}$ is obtained at the part of the element when the index "$\gamma$" shows $\omega_m=\ln(1.2/X_0)$. Elsewhere, at other parts, it is less than $\gamma_{max}$. Also, $\gamma_{max}$, can be expressed by formula (12). Thus, with $0<n<1$, mode conversion is less than the conventional element in Literature II, and crosstalk characteristic can be improved.

Next, by solving the coupling formula, a simulation can be made for the crosstalk characteristic in the conventional example of Literature I and in this embodiment. Crosstalk characteristic of this embodiment can be expressed by using the min/max coupling coefficient ratio $R=X_0/X_e$, $\Delta\beta\cdot L$, and the element length coupling length ratio R = "element ratio"/"coupling length".

FIGS. 6A and 6B show the diagrams expressing the crosstalk characteristic of the conventional example in Literature I at $R=0.01$ and $10^{-4}$. In these diagrams, the vertical axis shows the crosstalk, and the horizontal axis is the ratio "element length"/"coupling length".

Curves ④, ⑤, ⑥ and ⑦ in FIG. 6A show the crosstalk characteristics in setting $\Delta\beta\cdot L/\pi=3$, 2, 1.5 and 1. Curves ⑧, ⑨ 10 and 11 in FIG. 6B show crosstalk characteristics in setting $\Delta\beta\cdot L/\pi=4$, 3, 2 and 1.

In the conventional cases, these are not shown in diagrams, whereas, crosstalk changes greatly by "element length"/"coupling length" at $R=0.1$. Thus, sufficiently practical crosstalk characteristics cannot be obtained from the prior art.

Figure 6:
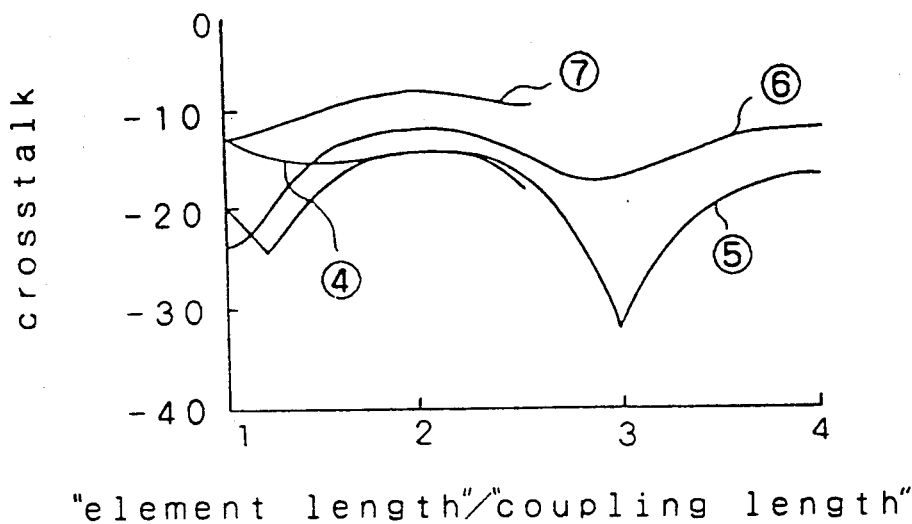
FIGS. 6A and 6B are views showing crosstalk characteristics of a conventional element.
Figure 6:
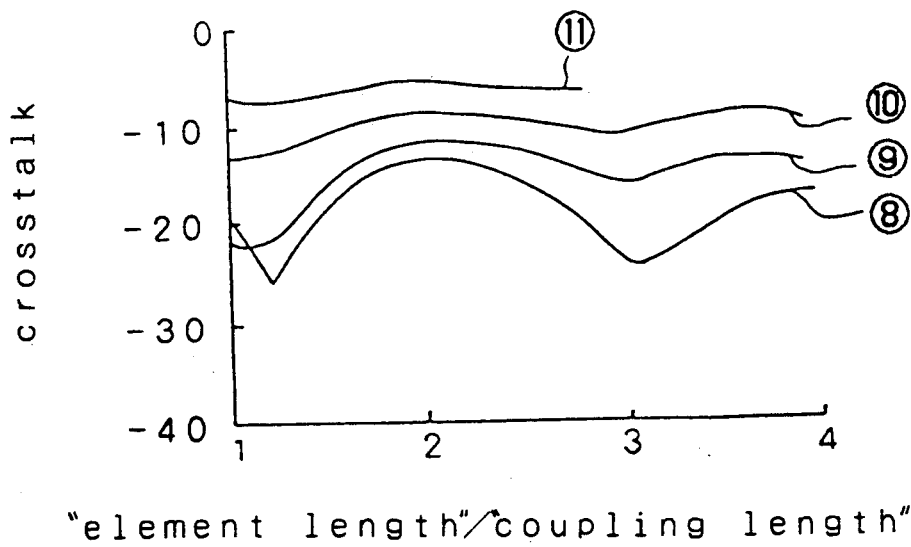

As shown in FIG. 6, with a min/max coupling coefficient ratio $R=0.01$, a crosstalk of average about $-15$ dB can be obtained with $\Delta\beta\cdot L/\pi=1.5$. At $R=10^{-4}$, to achieve a crosstalk average of about $-15$ dB, it is necessary to increase $\Delta\beta\cdot L/\pi$ over 3.

FIGS. 7A and 7B show the diagrams of crosstalk characteristics in setting $n=\frac{1}{3}$ and $\frac{1}{2}$ in the first embodiment with $R=0.01$. In FIGS. 7A and 7B, the vertical axis in the diagram shows crosstalk, and the horizontal axis shows the "element length"/"coupling length". In FIGS. 7A and 7B, the specified (normalized) local branch angle $d\omega/dZ$ in its maximum angle ($d\omega/dZ$ at $Z=0$) was set $\pi/360$ with $Z_0=0.01\times L$.

Curves ⓐ, ⓑ, ⓒ, ⓓ, and ⓔ in FIG. 7A show crosstalk characteristics in the case of $\Delta\beta\cdot L/\pi=4$, 3, 2, 1.5 and 1, respectively. Similarly, curves ⓕ, ⓖ, ⓗ, ⓘ and ⓙ in FIG. 7B show crosstalk characteristics in the case of $\Delta\beta\cdot L/\pi=4$, 3, 2, 1.5 and 1, respectively. Although no diagram is shown, in conventional examples and in this embodiment, with $R=0.1$, crosstalk changes greatly by "element length"/"coupling length". Thus, practical enough crosstalk characteristics cannot be obtained. Preferably, it is recommended to set the min/max coupling coefficient ratio R to $0.003<R<0.03$, and $R\approx0.001$ is especially preferable.

Comparing the optical switch in this embodiment with the conventional optical switch in Literature I, as shown in FIG. 6, the conventional case barely averages about $-15$ dB crosstalk with $R=0.01$ and $\Delta\beta\cdot L/\pi=1.5$. For obtaining a crosstalk average about $-15$ dB with $R=10^{-4}$, it is necessary to increase $\Delta\beta\cdot L/\pi$ over 3.

On the other hand, in this embodiment, as understood from FIGS. 7A and 7B, in all cases of $n=\frac{1}{3}$ ($\omega=a^3\sqrt{Z+Z_0}$) and $n=\frac{1}{2}$ ($\omega=a\sqrt{Z+Z_0}$) an average crosstalk of $-20$ dB can be obtained at nearly $\Delta\beta\cdot L/\pi=1.5$.

Accordingly, in this embodiment, crosstalk of $-20$ dB can be obtained regardless of "element length"/"coupling length" with nearly $\Delta\beta\cdot L/\pi=1.5$. Thus, crosstalk can be improved by over 5 dB as compared with conventional examples in Literature I.

Next, analysis is made separately from the above-mentioned analysis on this first embodiment. The definition of each parameter is the same as that of the above-mentioned analysis unless otherwise specified.

Next, then specified (normalized) waveguide route interval "$\omega$" is given as shown in the following formula (13).

$$\omega = s \cdot (D - D_0) = a \cdot \sqrt[m]{L} \cdot \sqrt[m]{\tau} \qquad (13)$$

where m is a real number larger than 1, and is related with n mentioned above (see text accompanying Equation 7) as in $n=1/m$. Also, "$\tau$" is a specified or normalized distance Z specified with element length (electrode length) L. "$\tau$"$=0$ shows the starting position of bending portion II (position corresponding to $Z=0$), and $\tau=1$ shows the ending position (position corresponding to $Z=L$) of bending portion II.

The index $\gamma$ is expressed by the following formula (14) on the basis of formula (13).

$$\gamma = \frac{1}{2\cdot\Delta\beta} \cdot \frac{X^2}{(X^2+1)^{3/2}} \cdot \frac{d\omega}{Ld\tau} \qquad (14)$$

When the value of index $\gamma$ peaks at $X=\sqrt{2}(=X_p)$.

$X_p$ is expressed in the following formula (15).

$$X_p = \frac{\Delta\beta}{2\cdot K_0 \cdot \exp\{-s\cdot(D-D_0)\}} \qquad (15)$$

By formula (14) and (15), index $\gamma$ ($\gamma_p$) at its peak can be expressed by the following formula (16).

$$\tau_p = \frac{1}{4\cdot\sqrt{2}\cdot K_0\cdot L} \cdot \frac{X_p^2}{(X_p^2+1)^{3/2}} \cdot \frac{X_p}{R\cdot X_e} \cdot \frac{(-\ln R)^m}{m} \qquad (16)$$

-continued $$\ln\left(\frac{X_p}{R \cdot X_e}\right)^{1-1}$$

where $K_0$ is a coupling coefficient (minimum coupling coefficient) with $\tau=0$, and $K_e$ is a coupling coefficient (maximum coupling coefficient) with $\tau=1$. R shows the ratio of min/max coupling coefficient, $R=X_0/X_e=-K_e/K_0$, $X_0=\Delta\beta/(2\cdot K_0)$, and $X_e=\Delta\beta/(2\cdot K_e)$.

Minimizing $K_0\cdot L$ and R will now be considered.

FIG. 8 shows one example of results obtained by numerical analysis for optimizing R. In FIG. 8, the vertical axis shows crosstalk, and the horizontal axis shows the ratio of min/max coupling coefficient. Curves i1 and i2 show crosstalk characteristics as calculated from the deviation (optical power ratio) or normal mode at the waveguide route at the finishing ends of the bending parts, curves ii1 and ii2 show crosstalk characteristics estimated from "$\gamma_p$". (This crosstalk characteristic is a standard target, and is not an exact value.) In the numerical analysis in FIG. 8, curves i1 and ii1 show crosstalk characteristic at m=2, $K_0\cdot L=60$, and $\Delta\beta\cdot L/\pi=1$. Also, crosstalk characteristics are shown with curves i2 and ii2 with $\Delta\beta\cdot L/\pi=2$.

With an increase of R, "$\gamma_p$" is reduced, thus, the crosstalk estimated from "$\gamma_p$" is improved as shown in FIG. 8. With the increase of R, it is difficult to set the power-ratio 1:0 or 0:1 for the normal mode at the finishing ends of the bending portions of the waveguide routes 12 and 14, and thus the crosstalk becomes worse.

Figure 9:
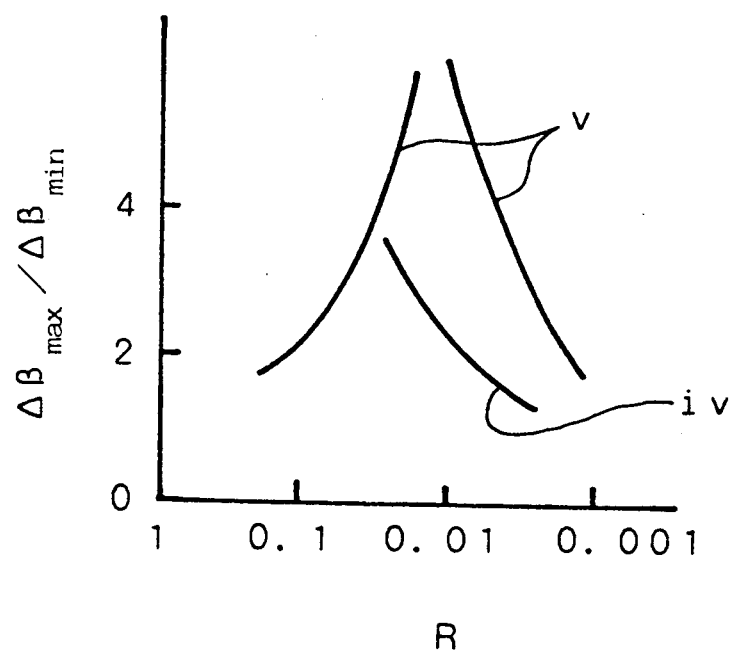
FIG. 9 is a view showing an example of the result of analysis for optimization of $K_0L$.

FIG. 9 represents one example of the results obtained from numerical analysis for optimizing $K_0\cdot L$. In FIG. 9, the vertical axis shows $\Delta\beta_{max}/\Delta\beta_{min}$, and the horizontal axis shows the ratio R of min/max coupling coefficient. In the results of the numerical analysis shown in FIG. 9, curve iv shows the relation between R and $\Delta\beta_{max}/\Delta\beta_{min}$ in case of m=2 and $K_0\cdot L=30$. Curve v shows the relation between R and $\Delta\beta_{max}/\Delta\beta_{min}$ in the case of m=2 and $K_0\cdot L=60$.

Crosstalk is improved by increasing the drive voltage from its 0 (initial) value. We let $\Delta\beta_{min}$ be the value of $\Delta\beta$ when crosstalk is $-15$ dB initially. Then, by further increase from $\Delta\beta_{min}$, crosstalk is aggravated with larger mode conversion at the branch-side border of the electrode by increase of $\Delta\beta$. In this aggravating process, $\Delta\beta_{max}$ shows the value of when it becomes $-15$ dB initially. Accordingly, larger $\Delta\beta_{max}/\Delta\beta_{min}$ results in wider drive voltage range obtaining the crosstalk characteristic suitable for practical applications. From numerical analysis, $0.003<R<0.03$ is better, and $R\approx 0.01$ is more preferable, also, $K_0\cdot L>40$ is desirable. However, in an expression of waveguide route interval $\omega$ as in formula (13), the effect of characteristic change of $K_0\cdot L$ is weak, thus, $K_0\cdot L>40$ may not necessarily be applied.

Figure 10:
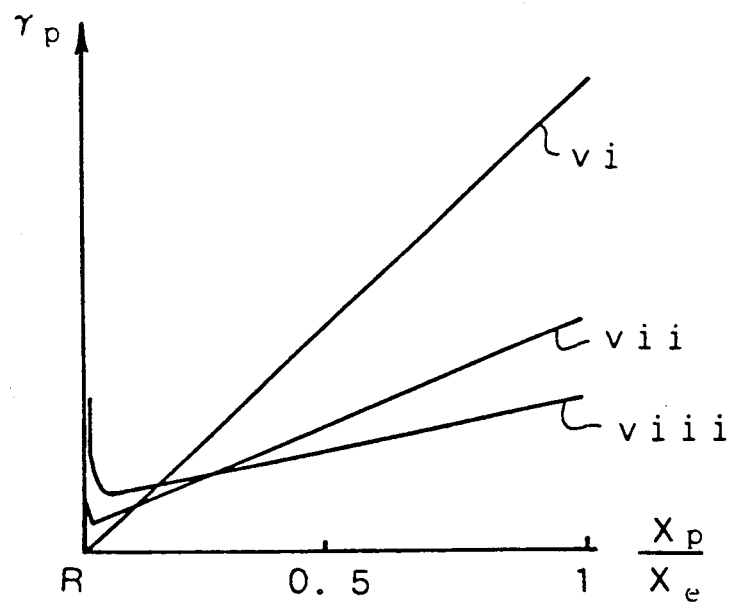
FIG. 10 is a view for explaining the m dependency of peak $\gamma_p$.

FIG. 10 shows a diagram for explaining the dependency of index $\gamma$ on m of peak $\gamma_p$. The vertical axis in FIG. 10 shows the value of peak $\gamma_p$, and the horizontal axis shows the ratio of $X_p/X_e$. In the analysis of FIG. 10, curves vi, vii and viii show the manners of changes in peak $\gamma_p$ in the case of $R=0.01$, m=1, 2 and 3. $X_p/X_e$ shows the amount in proportion to the inverse of drive-voltage.

In the case of m=1, it is equivalent to the case of a linear waveguide route from $\tau=0$ to $\tau=1$ of waveguide route 12 and 14. Also, m=2 and 3 is equivalent to the case of a curved waveguide route from $\tau=0$ to $\tau=1$ of waveguide routes 12 and 14. As understood from curves vi, vii and viii, when the parts at $\tau=1$ from $\tau=0$ of waveguide routes 12 and 14 are formed as curved waveguide routes, the peak $\gamma_p$ can be made small as a whole with smaller peak $\gamma_p$ at low operation voltage, thus, crosstalk characteristic elevation can be expected.

With m=2 and 3, the open angle is larger at around $X_p/X_o=R$, thereby, $\gamma_p$ is larger. Thus, $\omega=\alpha\cdot{}^m\sqrt{L}\cdot{}^m\sqrt{\tau+\tau_0}$ is preferable, and in the case of $\omega=\alpha\cdot{}^m\sqrt{L}\cdot{}^m\sqrt{\tau+\tau_0}$, the above analysis can be considered to be permitted approximately.

In this analysis, waveguide route interval $\omega$ is set to be $\omega=\alpha\cdot{}^m\sqrt{L}\cdot{}^m\sqrt{\tau+\tau_0}$ (wherein, m is a real number larger than 1) is proved to be better. $\alpha$ and $\tau_0$ are constants set optionally with the design, and it is expressed as $\tau_0=Z_0/L$. Also, $0.003<R<0.03$ is preferable, and $R\approx 0.01$ is more preferable. It is preferable to form the waveguide route of the waveguide route system to preserve the normal mode for fulfilling the formula:

$$\frac{2\cdot K(\tau)}{d\omega/L\cdot d\tau} > 0.43.$$

In the formation of waveguide routes 12 and 14, a symmetric arrangement may be made about the Z-axis for the inside edge a1 of waveguide route 12 and inside edge b1 of waveguide route 14, as seen in FIG. 3, for example. That is to say, each position of inside edge a1 of waveguide route 12 and inside edge b1 of waveguide route 14 may be spaced by the distance D/2 vertically from the Z-axis.

Figure 11:
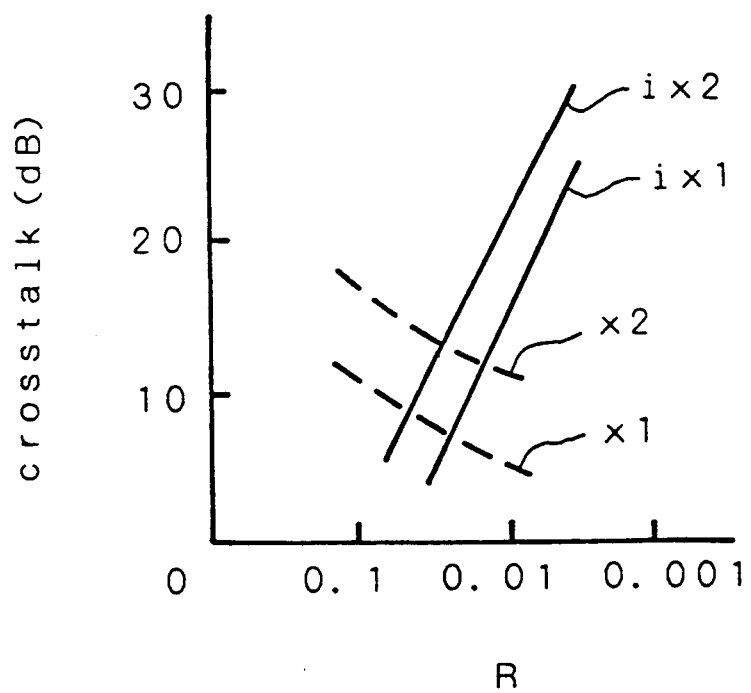
FIG. 11 is a view showing an example of crosstalk characteristics in the case where the waveguide route portion from $\tau=0$ to $\tau=1$ is a straight line waveguide path.

FIG. 11 shows one example of crosstalk characteristic in the case of m=1 and from $\tau=0$ up to $\tau=1$ as linear waveguide route. FIG. 11 is the same diagram as that of FIG. 8, and curves ix1 and ix2 show waveguide routes calculated from the deviation of the normal mode on the waveguide route at the electrode terminal end. Curves x1 and x2 show crosstalk characteristics estimated from $\gamma_{max}$. In the numerical analysis of FIG. 11, crosstalk characteristics are shown with curves ix1 and x1 in case of m=1, $K_0\cdot L=60$ and $\Delta\beta\cdot L/\pi=1$. Curves ix2 and x2 show crosstalk characteristics in the case of m=1, $K_0\cdot L=60$ and $\Delta\beta\cdot L/\pi=2$. As understood from FIGS. 8 and 11, crosstalk characteristics will be elevated by curve form rather than linear waveguide route in a zone from $\tau=0$ to $\tau=1$.

SECOND EMBODIMENT

Figure 12:
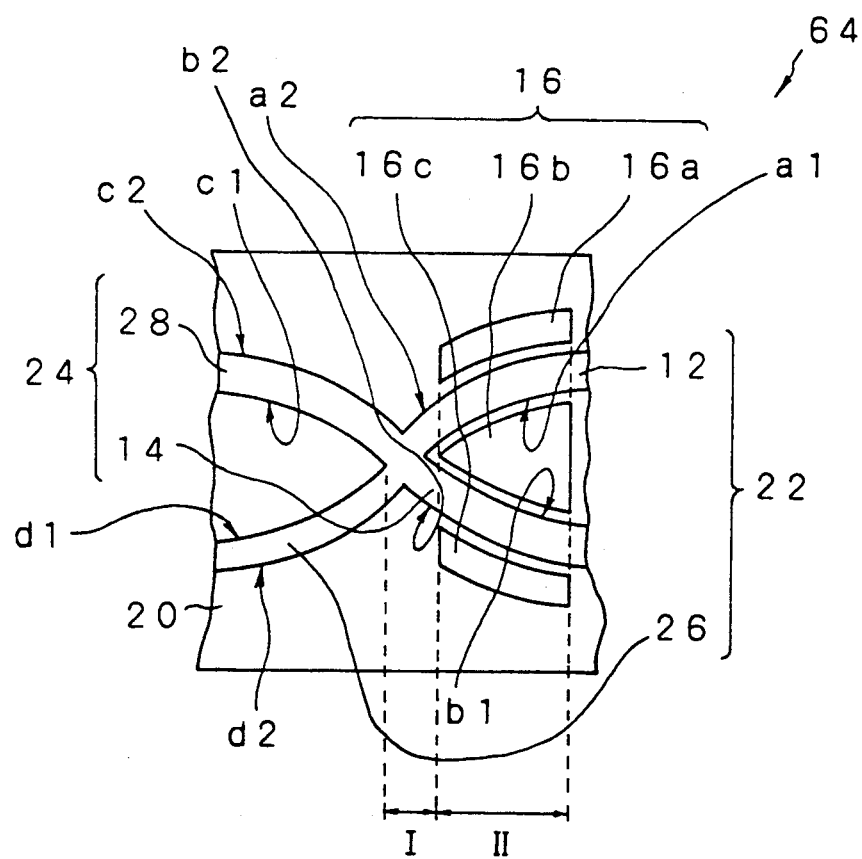
FIG. 12 is a fragmentary plan view schematically showing the construction of the second embodiment of the invention.

FIG. 12 shows a plan view outline for the constitution of the second embodiment of this invention. The same symbols are used for showing the factors or components of the constitution corresponding to those of first embodiment.

The following shows the description of different points from those of the first embodiment, and those same points are abbreviated on those details.

The first embodiment reveals the examples applying this invention for an optical switch of Y-branch type structure. This second embodiment shows the examples applying this invention for an optical switch of X-branch type structure.

As shown in FIG. 12, a waveguide type optical switch 64 of the first embodiment comprises two straight advancing waveguide routes 22 and 24 which cross to form an X-branch. The straight advancing waveguide route 22 comprises first waveguide route 12 and first incidence (input) side waveguide route 26. The other straight advancing waveguide route 24 comprises second waveguide route 14 and second incidence (input)side waveguide route 28. We note that the waveguide routes in FIG. 12 are curved, and in using the term "straight advancing" we are referring to the fact that light propagating through the waveguide switch 64 continues its forward path along the corresponding waveguide route. That is, light traveling along route 20 crosses the "X" to route 12 and does not turn to route 14; light traveling along route 28 crosses the "X" to route 14 and does not turn to route 12.

In this embodiment, the width of first incidence side waveguide route 26 is more narrow than that of second incidence side waveguide route 28, to thereby cause a $\Delta\beta$ structurally. The width of first and second waveguide routes 12 and 14 is equal. Inside edge c1 of waveguide route 28 and inside edge d1 of waveguide route 26 are similarly arranged as with the inside edge a1 and b1 of waveguide routes 12 and 14. Outside edge c2 of the waveguide route 28 and outside edge d2 of the waveguide route 26 are parallel with the inside edges c1 and d1, respectively.

THIRD EMBODIMENT

Figure 13:
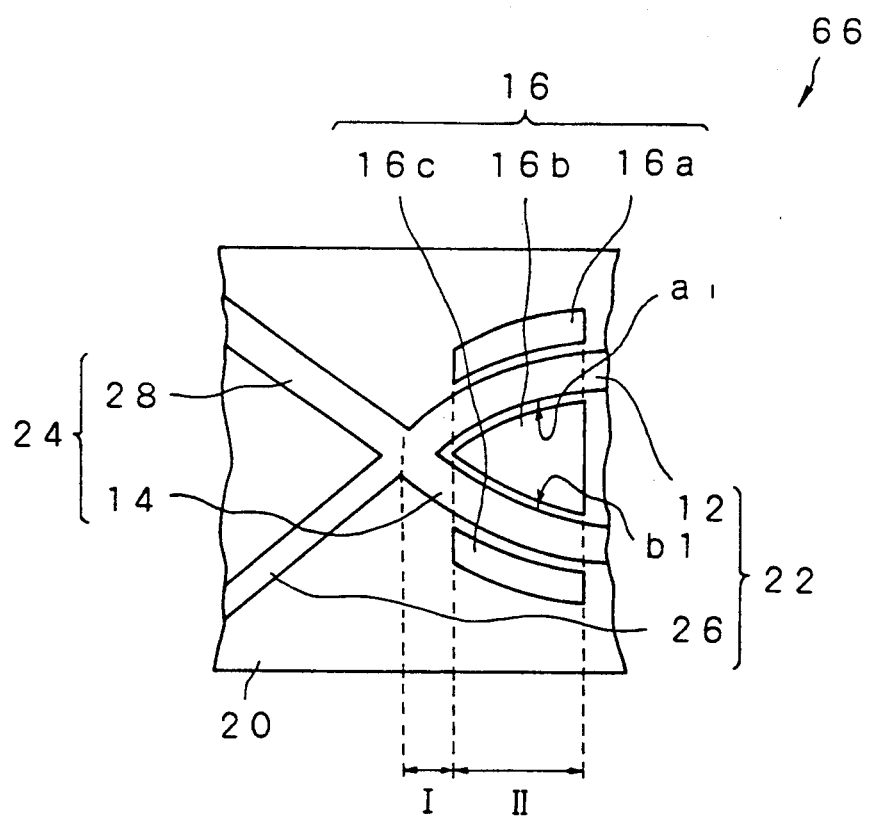
FIG. 13 is a fragmentary plan view schematically showing the construction of the third embodiment of the invention.

FIG. 13 is a schematic plan view showing composition of the third embodiment of this invention. The same symbols are used for all components of the structures of the above mentioned embodiments.

At the waveguide-type optical switch 66 of the third embodiment, first and second straight advancing waveguide routes 26 and 28 are straight or linear waveguide routes, and others are the same in structure of the second embodiment.

FOURTH EMBODIMENT

Figure 14:
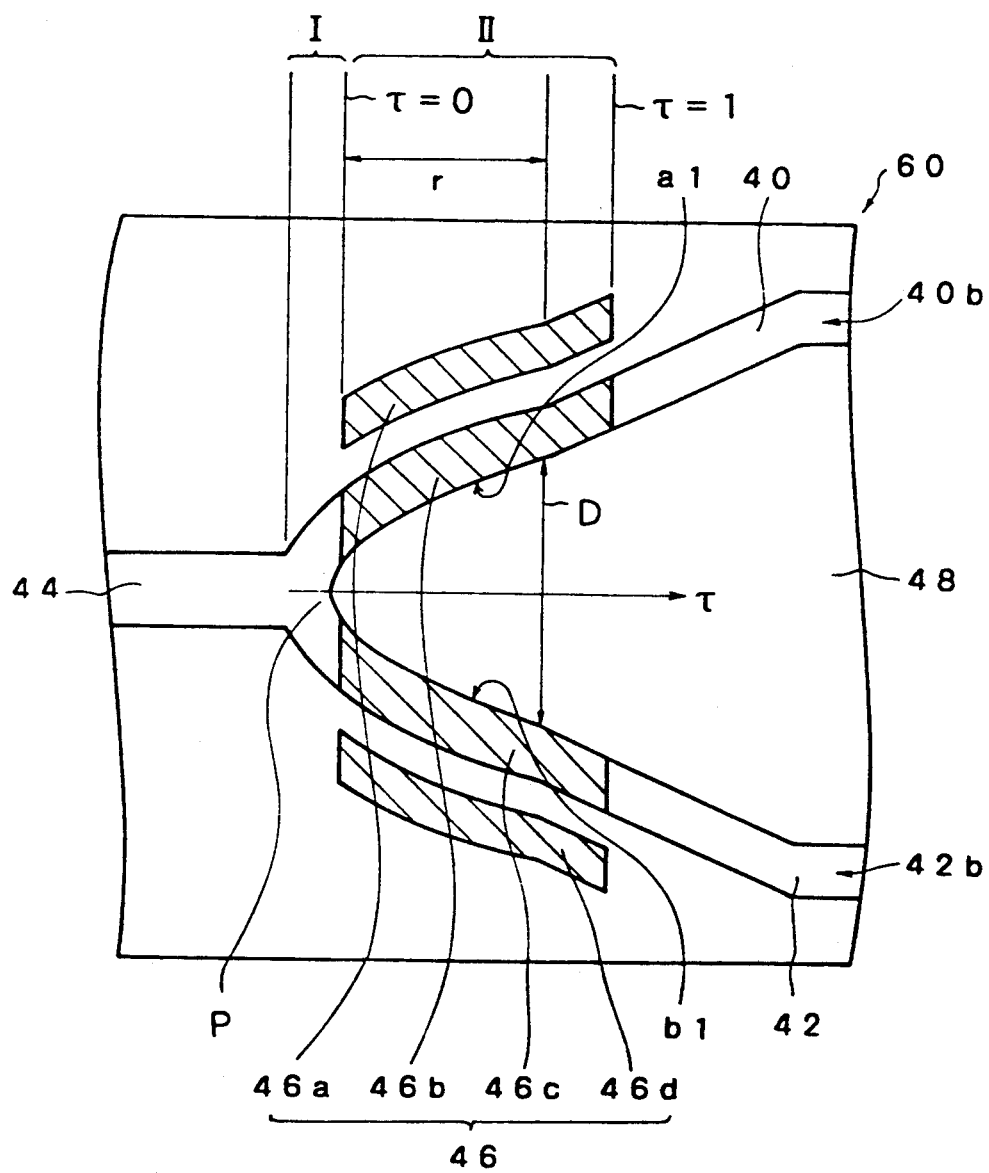
FIG. 14 is a fragmentary plan view schematically showing the construction of the fourth embodiment of the invention.

FIG. 14 is a schematic plan view showing structure of the fourth embodiment of this invention. Waveguide-type optical switch 60 of the fourth embodiment is provided with branched first and second routes 40 and 42, and an electrode 46 for controlling the propagation-constant difference or refractive index difference between them. The interval between two waveguide routes 40 and 42 extends from the branch part I of waveguide routes 40 and 42 towards the terminal parts 40b and 42b, as shown in FIG. 14.

At least a bending portion II is provided at each of two waveguide routes 40 and 42, and the local branch angle or opening angle of waveguide routes 40 and 42 is enlarged on the side of starting end ($\tau=0$) of bending portion II. The local branch angle of waveguide routes 40 and 42 on the side of the finishing end (terminal) ($\tau=1$) of the bending portion II is reduced. In this embodiment, the local branch angle at bending portion II of waveguide routes 40 and 42 is gradually reduced from the starting end ($\tau=0$) to the finishing end ($\tau=1$) to make a smooth bend of the waveguide route shape at the bending portion II. In this embodiment, however, the local branch angle is gradually reduced up to $\tau=r$, and it is less than the local branch angle at $\tau=0$ or neighborhood thereof from $\tau=r$ to $\tau=1$.

In more detailed description, the waveguide-type optical switch 60 of this embodiment is provided with waveguide routes 44, 40, and 42 composing a Y-branch. An electrode 46 is provided for the branched waveguide routes 40 and 42.

The Y-branch is formed by connecting respective end parts of waveguide routes 40 and 42 to one end part of waveguide route 44. These waveguide routes 40, 42 and 44 are provided on the substrate 48. The substrate 48 can change the refractive index electrically; for instance, it can be a Z-cut LiNbO$_3$ substrate.

Also, electrode 46 comprises electrode members 46a, 46b, 46c and 46d. The electrode member 46a is located beside the waveguide route 40 on the side more remote from the waveguide route 42. The electrode member 46b is arranged on waveguide route 40, and electrode member 46c is arranged on waveguide route 42. Also, the electrode member 46d is located beside the waveguide route 42 on the side more remote from the waveguide route 40. These electrode members 46a and 46d are provided on the substrate 48. The electrode-starting end position is set to $\tau=0$ and the electrode-finishing end position is set to $\tau=1$. Each electrode member 46a to 46d extends from $\tau=0$ to $\tau=1$.

The first and second waveguide routes 40 and 42 from those systems preserve or hold the normal mode in a zone between the starting end ($\tau=0$) of branch part I and the finishing end ($\tau=1$). Accordingly, this waveguide route system is provided with the branch part I and bending portion II of at least two waveguide routes 40 and 42.

Branch part I divides the optical power of the normal mode of this waveguide route system equally into two waveguide routes 40 and 42, for which the center line of each waveguide of branch part I has a linear symmetric shape about an axis $\tau$.

The terminal (finishing) part of the bending portion II of two waveguide routes 40 and 42 (waveguide route part at $\tau=1$ or its neighborhood) concentrates optical power of normal mode of waveguide route system into either one of two waveguide routes 40 and 42.

The finishing end parts of the bending portions II of two waveguide routes 40 and 42 are separated from each other in such a direction that, with voltage applied to the electrode 46, the field distribution (or optical power strength distribution) of the normal mode can exist at the electrode terminal part of either but not both of waveguide routes 40 and 42. The interval (separation) between waveguide routes 40 and 42 continues to increase beyond bending portion II in a zone from the electrode terminal part of waveguide routes 40 and 42 (marked with diagonal lines in FIG. 14) up to the finishing parts 40b and 42b where the routes become parallel However, the waveguide route part where $\tau>1$ may be omitted.

Next, by numerical analysis, description is made on the shape of bending portion II of this embodiment. The interval (separation distance) D of the waveguide routes is regarded as a function of the specified (normalized) axial distance $\tau$. The specified distance $\tau$ is a distance obtained by specifying a distance Z by element length (electrode length). $\tau=0$ shows the starting position (position corresponding to Z=0) of the bending portion II. $\tau=1$ shows the finishing end position (position corresponding to Z=L) of the bending portion II. In the following analysis, the range of $0 \leq \tau \leq 1$ is considered. As noted earlier, the $\tau$-axis is an axis set in passing the branch point P on the substrate, and with respect to the $\tau$-axis the center lines of the waveguides are symmetrical.

For improving the crosstalk characteristics of the device, it is necessary to hold to a small value the conversion between even mode and odd mode. The index $\gamma$ in case of interval D between waveguide routes regarded as a function of specified (normalized) distance $\tau$ is shown by the following formula (17).

$$\gamma = \frac{1}{2 \cdot \Delta\beta \cdot L} \cdot \frac{X^2}{(X^2 + 1)^{3/2}} \cdot \frac{d\omega}{d\tau} \quad (17)$$

wherein $\omega = S \cdot (D - D_0)$; $D_0$ denotes the interval between the waveguide routes at $\tau = 0$; $\Delta\beta$ represents the propagation constant difference caused electrically between waveguide routes 40 and 42 at the bending portion II; L is the distance from the starting end of the bending portion II to the finishing end (from $\tau = 0$ to $\tau = 1$); and where $X = \Delta\beta/(2 \cdot K(\tau))$ and $K(\tau)$ show the coupling coefficient between waveguide routes 40 and 42 at the specified distance. $K(\tau)$ is expressed by the following formula (18).

$$K(\tau) = K_0 \cdot \exp\{-s \cdot (D(\tau) - D_0)\} \quad (18)$$

As understood from formula (17), index $\tau$ is the product of the local branch angle $d\omega/d\tau$, the inverse of phase difference $\frac{1}{2} \cdot \Delta\beta \cdot L$ and the expression F where $F = X^2/(X^2 + 1)^{3/2}$.

F contains $K(\tau)$, and a function having a peak at $$X = \sqrt{2} = X_p.$$

The $\tau_p$ of $X_p$ changes in proportion to the voltage. As $K(\tau_p)$ is expressed as $K(\tau_p) = \Delta\beta/2 \cdot X_p$ then, position $\tau_p$ is expressed as $\tau_p = K^{-1}(\Delta\beta/2 \cdot X_p)$ with a change of $\Delta\beta$. $K^{-1}$ is an inverse function of K.

Here, by connecting the mutual ends of one side of two straight waveguide routes, a branch is formed, and separation D between waveguide routes is widened from the branch. A waveguide route system is formed to preserve the normal mode by these straight waveguide routes (for instance, cases of waveguide routes 3 and 4 shown in FIG. 1). The manner of change of index $\gamma$ of mode conversion is described with reference to FIG. 15.

Figure 15:
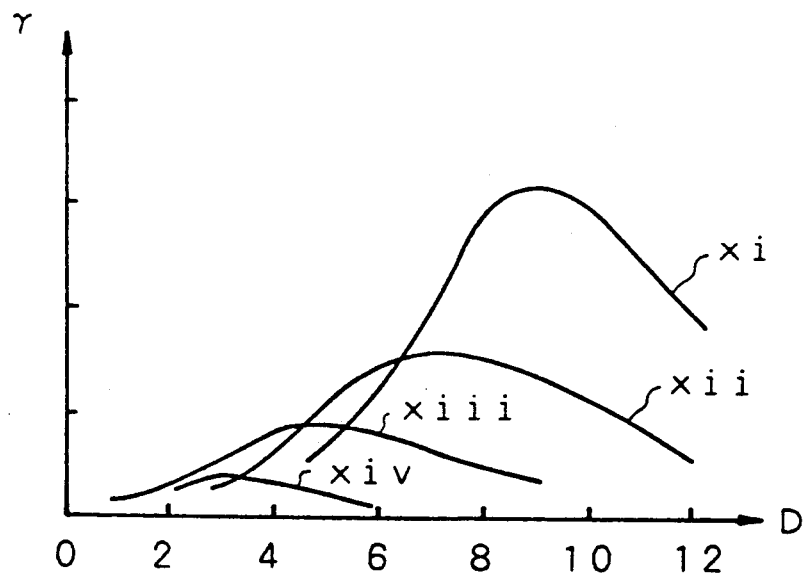
FIG. 15 is a view for explaining the manner of changes in the index $\gamma$ of mode conversion.

FIG. 15 shows four curves relating the index $\gamma$ to separation D and drive voltage. Index $\gamma$ of mode conversion is shown in the vertical axis. Interval D between the straight waveguide routes of FIG. 1 is the horizontal axis, as shown in FIG. 15. In the numerical analysis, the wavelength of the normal mode is set to 1.3 μm, the relative refractive index difference between the substrate and the waveguide routes $\Delta = 0.1\%$, the waveguide route width is set to 7 μm, the refractive index difference $\Delta n$ caused in between two waveguide routes by input of drive voltage is set as $\Delta n = 5 \times 10^{-5}$, $1 \times 10^{-4}$, $2 \times 10^{-4}$ and $5 \times 10^{-4}$. Then, the values of index $\gamma$ on the waveguide routes at position of interval D between waveguide routes are plotted to show curves xi, xii, xiii and xiv. In this analysis, we let $\Delta\beta = (\text{``}2\pi\text{''}/\text{``wavelength of normal mode''}) \cdot \Delta n$.

As shown in FIG. 15, each curve for index $\gamma$ is distributed between the finishing end and starting end of two waveguide routes. Each curve for $\gamma$ has a peak $\gamma_p$ at specific intervals D between the waveguide routes. With a higher drive voltage, $\Delta n$ increases, and the position of peak $\gamma_p$ is shifted to the left on the horizontal axis of FIG. 15. Moreover, along with the shift to the left, the value on the Y-axis of peak $\gamma_p$ decreases.

On the other hand, the index $\gamma$ is proportional to the local branch angle $d\omega/d\tau$ (see the formula (17)). Even if $\Delta\beta$ increases, the value of peak $\gamma_p$ can be held constant by greater local branch angle at the branch of two waveguide routes, namely, at small interval D of the waveguide routes.

By using $$X = \frac{\Delta\beta}{2 \cdot K} = \sqrt{2} = X_p$$

and formula (18), the interval $D_p$ between the waveguide routes at position inducing the peak $\gamma_p$ is expressed by the formula (19).

$$D_p - D_o = \frac{\ln\left(\frac{2 \cdot X_p}{K_o \cdot \Delta\beta}\right)}{s} \quad (19)$$

In this embodiment, peak $\gamma_p$ is considered constant regardless of $\Delta\beta$.

At the position to be the peak $\gamma_p$ (peak position), $\Delta\beta = X_p \cdot 2 \cdot K(\tau)$ is obtained, then, the following formula (19-1) is obtained from formula (17).

$$\gamma_p = \frac{X}{2 \cdot (X^2 + 1)^{3/2}} \cdot \frac{1}{2 \cdot K \cdot L} \cdot \frac{d\omega}{d\tau} \quad (19\text{-}1)$$

By using formula (18), formula (19-1) is deformed, then, the following formula (20) is obtained.

$$\frac{4 \cdot \gamma_p \cdot (X_p^2 + 1)^{3/2}}{X_p} \cdot K_0 \cdot L = \exp\omega \cdot \frac{d\omega}{d\tau} \quad (20)$$

In considering the left side of formula (20) constant, both sides of formula (20) are integrated, and the following formula (21) is obtained.

$$\omega = \ln\left(\frac{4 \cdot \gamma_p \cdot (X_p^2 + 1)^{3/2}}{X_p} \cdot K_o \cdot L \cdot \tau + C_o\right) = \ln\left(4 \cdot \sqrt{\frac{27}{2}} \cdot \gamma_p \cdot K_o \cdot L \cdot \tau + C_o\right) \quad (21)$$

Where, $K = K_0$ at $\tau = 0$, then, $C_0 = 1$.

Thus, in expressing $\omega$ by a logarithmic function of $\tau$ regardless of the size of $\Delta\beta$ and so, regardless of drive voltage, the value of $\gamma_p$ can be constant, and the mode-converting amount may be made constant.

For producing the optical switch, in addition to $\gamma_p$, there are such important parameters as R(min/max coupling coefficient ratio) at $\tau = 0$ and $\tau = 1$. At $\tau = 0$, by increasing the concentrating degree of the field distribution or the optical power strength distribution of the normal mode at one of the waveguide routes, the optical power ratio of the normal mode of the waveguide route 40 and 42 at $\tau = 1$ is approximated to 1:0 or 0:1. Also, it is necessary to reduce R for decreasing the conversion of mode induced at $\tau = 0$ by the influence of $\Delta\beta$ caused with input of voltage. For reducing the mode conversion at $\tau = 0$, it is necessary to reduce $X_0 = \Delta\beta/K_0$ ($X_0$ is a value of X at $\tau = 0$). For enlarging the mode concentration at $\tau = 1$, it is necessary to increase $X_e = \Delta\beta/K_e$ ($K_e$ is a value of X at $\tau = 1$), thus $X_0/X_e = K_e/K_o = R$ should be reduced.

However, smaller R will induce larger mode conversion with optical propagation from $\tau = 0$ to $\tau = 1$, therefore, R should be optimized. The optimum range of R is $0.003 < R < 0.03$, and more preferably, $R = 0.01$ regardless of function type showing the shape of waveguide route.

Also, $K_e/K_0 = \exp[-\{s \cdot D(1) - S \cdot D_0\}] = R$, thus, by formula (21), $$-\ln\left(4 \cdot \sqrt{\frac{27}{2}} \cdot \gamma_p \cdot K_o \cdot L + 1\right) = \ln R$$

Then, the following formula (22) is obtained.

$$\gamma_p = \frac{R^{-1} - 1}{K_o \cdot L} \cdot \frac{1}{4} \cdot \sqrt{\frac{2}{27}} \tag{22}$$

From this equation (22) and (21) noted above, we have $\omega = \ln[(R^{-1} - 1)\tau + 1]$.

When the portions of waveguide routes from $\tau = 0$ up to $\tau = 1$ are regarded as straight waveguide routes, $\gamma_p$ is expressed by the following formula (23).

$$\begin{aligned}
\gamma_p &= \frac{1}{\Delta\beta \cdot K_o} \cdot \frac{1}{\sqrt{27}} \cdot (-\ln R) \\
&= \frac{1}{K_o \cdot L} \cdot \frac{1}{2 \cdot R} \cdot \frac{2 \cdot K(1)}{\Delta\beta} \cdot \frac{1}{\sqrt{27}} \cdot (-\ln R) \\
&= \frac{R-1}{K_o \cdot L} \cdot \frac{1}{4} \cdot \sqrt{\frac{2}{27}} \cdot \frac{X_p}{X_e} \cdot (-\ln R)
\end{aligned} \tag{23}$$

Figure 16:
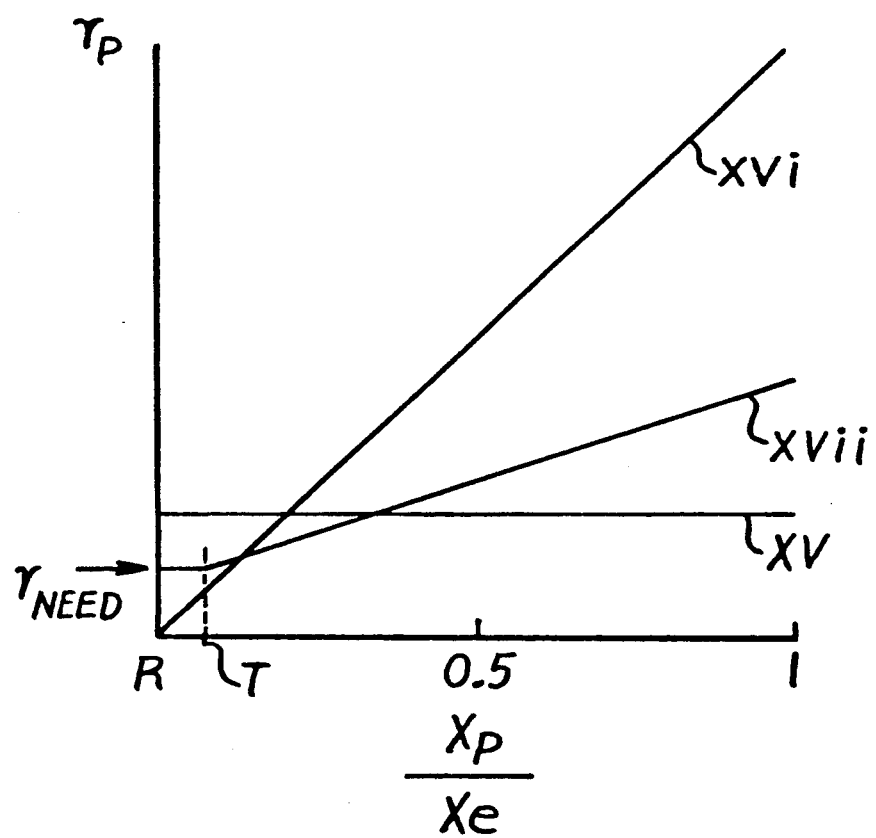
FIG. 16 is a view showing the manner of changes in the peak $\gamma$ with respect to $X_p/X_c$.

FIG. 16 plots $\gamma_p$ against $X_p/X_e$, and $\gamma_p$ being on the vertical axis, $X_p/X_e$ being on the horizontal axis. Curves xv and xvi show the changes of $\gamma_p$ obtained from the formulae (22) and (23).

$X_p/X_e = (2 \cdot K_e \cdot X_p)/\Delta\beta$ is proportional to the inverse of drive voltage. With $X_p/X_e = 1$, the position of peak $\gamma_p$ is at the position of $\tau = 1$, then, the position of peak $\gamma_p$ with $X_p/X_e = R$, the position of peak $\gamma_p$ is expressed as follows:

$$\frac{2 \cdot K_e/R}{\Delta\beta} \cdot X_p = \frac{2 \cdot K_o}{\Delta\beta} \cdot X_p = \frac{X_p}{X_o} = 1$$

Thus, the position of $\gamma_p$ is at the position of $\tau = 0$. As understood by curves xv and xvi, $\gamma_{max}$ becomes smaller at $$\frac{\sqrt{2}}{X_e} = 1$$

by setting the waveguide route in a zone from $\tau = 0$ to $\tau = 1$ as the logarithm type waveguide route (corresponding to curve xv) expressed by logarithm function of "$\tau$" rather than a straight waveguide route (corresponding to curve xvi). Accordingly, it is expected that mode conversion can be reduced by lower drive voltage, and then it would be possible to obtain crosstalk characteristics suitable for practical use.

Mode conversion would not be fully reduced without making peak $\gamma_p$ less than the value within a range from $$\frac{1}{2 \cdot \sqrt{27}} \text{ to } \frac{1}{3 \cdot \sqrt{27}}.$$

The peak $\gamma_p$ required for this is expressed as $\gamma_{need}$.

In forming the waveguide route, if the coupling coefficient $K_0$ is made stronger or larger through a technique such, for example, as disclosed in the Literature "IECE Technical Report OQE 83 -87 (1983)" to make an increase in the value of $K_0 \cdot L$ more than 60, a waveguide route of logarithmic type may be formed in the zone from $\tau = 0$ to $\tau = 1$. However, the value of the product $K_0 \cdot L$ is usually in a range of about 30 to about 60. In this case, by the formula (22), it is rather unreasonable to obtain fully small $\gamma_p$ in the formation of only waveguide route of logarithmic type in the zone from $\tau = 0$ to $\tau = 1$.

Accordingly, consider the use of a straight waveguide route on the side of $\tau = 1$ and a waveguide route of logarithmic type on the side of $\tau = 0$, to form bending portions of waveguide routes. On the side of $\tau = 0$, $\gamma_p$ can be reduced even by enlarging the local branch angle, so that by enlarging the local branch angle especially at or in the neighborhood of $\tau = 0$, the waveguide route interval or distance D is opened up to an interval obtaining the desired $R = K_e/K_0$. On the side of $\tau = 1$, the interval D of waveguide routes is opened up to an interval obtaining the desire $R = K_e/K_o$ by the straight waveguide route on the side of $\tau = 1$.

For shortening the device length (electrode length), it is very efficient to use the waveguide route of logarithmic type. Then, by using a logarithmic type waveguide route having $\gamma_p \simeq \gamma_{need}$, and extending the interval D therebetween, and thereafter by using the straight waveguide routes, the waveguide route interval D is widened to a desired interval in a remaining zone up to $\tau = 1$. Thereby, the manner of change of $\gamma_{max}$ in case of the waveguide-route-shape at the zone from $\tau = 0$ to $\tau = 1$ is expressed by curve xvii in FIG. 16. In curve xvii, a section of $\sqrt{2}/X_e$ from R to T and that from T to 1 show the manner of changes of $\gamma_p$ on straight waveguide route and logarithmic type waveguide route, respectively.

From this description, it should now be evident that it is beneficial to use the waveguide route of logarithmic type for shortening the device length.

For instance, in considering the distance $L_i$ needed to open the interval between waveguide routes up to the state $K/K_0 = R_i$, by the formula (22) on the waveguide route of logarithmic type, the following formula can be obtained.

$$L_i = \frac{R_i^{-1} - 1}{K_o \cdot \gamma_{need}} \cdot \frac{1}{4} \cdot \sqrt{\frac{2}{27}}$$

Also, by the formula (23) on a straight waveguide route, the following formula can be obtained.

$$\gamma_p = \frac{R_i^{-1}}{K_o \cdot L_i} \cdot \frac{1}{4} \cdot \sqrt{\frac{2}{27}} \cdot \frac{X_p}{X_i} \cdot (-\ln R) > \gamma_{need}$$

$$\therefore \frac{X_p}{X_i} \leq 1$$

$X_p/X_i$ becomes 1 at its maximum, then, on a straight waveguide route, the following formula can be obtained.

$$L_i = \frac{R_i^{-1}}{K_o \cdot \gamma_{need}} \cdot \frac{1}{4} \cdot \sqrt{\frac{2}{27}} \cdot (-\ln R_i)$$

Accordingly, it is possible to make distance $L_i$ about $(-\ln R_i)^{-1}$ times in case of straight waveguide route for the distance $L_i$ in case of logarithm type waveguide route. That is to say, the distance $L_i$ for the logarithmic route is related to the distance L, for the straight route as follows:

$$L_i(\text{logarithmic}) \approx L_i(\text{straight})/(-\ln R_i).$$

Next, consideration is given for the extent of a straight waveguide route and a logarithmic type waveguide route at the section from $\tau=0$ to $\tau=1$.

One consideration (idea) is to minimize the slant of the straight waveguide route. In this case, the length rate of "r" is expressed approximately by the following formula.

$$4 \cdot K_o \cdot L \cdot \sqrt{\frac{2}{27}} \cdot \gamma_{need} = \frac{1}{r} \cdot \exp\left(\frac{r-1}{r}\right)$$

As shown in FIG. 14, a logarithmic waveguide route may be taken for the section from $\tau=0$ to $\tau=r$, and straight type waveguide route may be taken for the section from $\tau=r$ to $\tau=1$.

Figure 17:
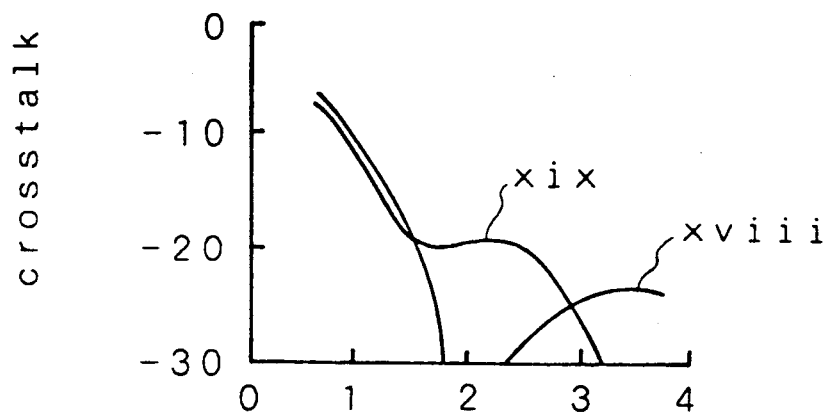
Figure 17:
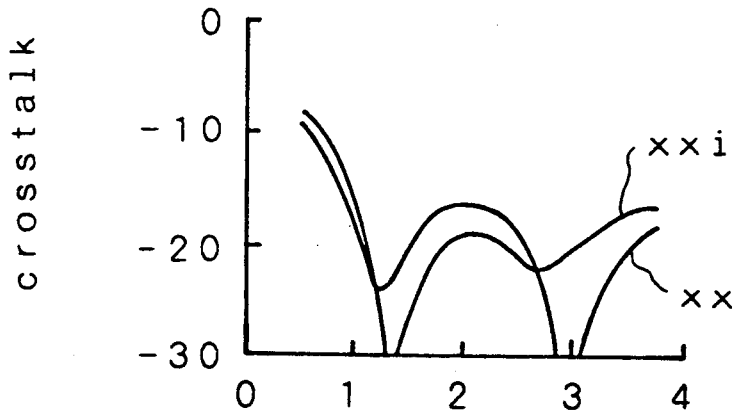

FIG. 17 shows one example of the analyzed result on crosstalk characteristic in this case. In FIG. 17, the vertical axis shows crosstalk, and the horizontal axis shows $\Delta\beta \cdot L/\pi$. In the analysis of FIG. 17A with $R=0.01$, $\gamma_{need}=1/(3\cdot\sqrt{27})$, crosstalk characteristics are shown by curves xviii and xix at $K_0 \cdot L=30$ and 60, respectively. In the analysis of FIG. 17B, where $R=0.01$, and $\gamma_{need}=1/(2\cdot\sqrt{27})$, crosstalk characteristics are shown with curves XX and XXi at $K_0 \cdot L=30$ and 60, respectively.

Another idea is as follows: For concentrating the field distribution of the normal mode to the one of the waveguide routes, ideally, the minimum essential value $X_e$ is obtained to make 0:1 or 1:0 of the optical power ratio of the waveguide routes 40 and 42 at $\tau=1$ (in this case, $X_e$ is expressed as $X_{ef}$). Then, the peak $\gamma_p$ is obtained at $X_e = X_{ef}$. And then, a logarithmic type waveguide route is taken for the section from $\tau=0$ up to peak position in this case, and also, straight waveguide route is taken for the section from the peak position to $\tau=1$. The coupling coefficient $K_p$ at the position of peak $\gamma_p$ when $X_e$ is set to $X_{ef}$ is shown as follows:

$$K_p = K_e \cdot \frac{X_{ef}}{\sqrt{2}}$$

By $R_i$, $K_e = K_p$, the following relation is obtained.

$$r = \left(\frac{1}{R_i} - 1\right) \cdot \sqrt{\frac{2}{27}} \div (4 \cdot K_o \cdot L \cdot \gamma_{need})$$

FIG. 18 shows one example of the analyzed result on crosstalk characteristics in this case. In the analysis for FIG. 18, crosstalk characteristics in the case of $R=0.01$ and $\gamma_{need}=1/(3\cdot\sqrt{27})$ are shown by curves xxii and xxiii at $K_0 \cdot L=30$ and 60, respectively.

FIG. 19 shows one example of the analyzed result on crosstalk characteristics in the case of the straight waveguide route from $\tau=0$ to $\tau=1$. In FIG. 19, the crosstalk characteristics in the case of $R=0.01$ are shown by curves xxiv and xxv at $K_0 \cdot L=30$ and 60, respectively.

In FIGS. 17 and 19, $\Delta\beta \cdot L/\pi$ for obtaining the crosstalk characteristics suitable for practical uses in cases of straight waveguide routes in a zone from $\tau=0$ to $\tau=1$ is nearly 1.5 times that of the case where a waveguide route comprises a logarithmic type waveguide route in a zone from $\tau=0$ to $\tau=r$ and a straight waveguide route from $\tau=r$ to $\tau=1$. Accordingly, with this embodiment, drive voltage might be reduced over 70% below conventional cases.

In this embodiment, $\Delta\beta \cdot L/\pi$ of the case of the extinction ratio or optical disappearing ratio over 10 dB is about 60% to about 70% of the conventional cases, thus, its level of drive voltage can be reduced. As shown in FIGS. 17 and 18, it is possible to extend the range of drive voltage obtaining the crosstalk less than $-20$ dB.

In the foregoing description of the embodiment, the examples shown in FIG. 14 reveal the wider local branch angle between waveguide routes than that between logarithmic type waveguide routes at $\tau=r$, but it is more preferable to make local branch angle between straight waveguide routes to that between logarithmic type waveguide routes at $\tau=r$.

The above example concerned the straight line waveguide routes and the logarithmically curved waveguide routes, but it is possible to consider intermediate waveguide routes between the straight line and logarithmically curved waveguide routes. The two curves $I_1$ and $I_2$ (not shown in the drawings) may be thought of as formulae specifying the shape of curve of center lines of such waveguide routes. When e is a parameter specifying the shape of curve and $\omega$ is the normalized distance or interval between opposed inside edges of the first and second waveguide routes as noted above, curve $I_1$ is given as $$\omega = \ln[(R^{-1}-1)f(\tau)+1].$$

where $$f(\tau) = \{\exp[(-\ln R)e\tau] - 1\}/\{\exp[(-\ln R)e] - 1\}$$

$$0 \leq e \leq 1,$$

$$\tau = Z/L.$$

If the parameter is $e=0$, it specifies a logarithmic curve, while $e=1$ specifies a straight line. By setting the parameter e to a suitable value of $0 < e < 1$, an intermediate curve between straight line and logarithmic curves can be obtained.

Curve $I_2$ is given as $$\omega = \ln(R^{-1})\{\ln[(R^{-1}-1)e\tau+1]\}/\{\ln[(R^{-1}-1)e+1]\}$$

where, $$0 \leq e \leq 1,$$

$$\tau = Z/L.$$

In this case, $e=0$ specifies a straight line while $e=1$ specifies a logarithmic curve. Again in this case, by setting the parameter e to a suitable value as $0 < e < 1$, it is possible to obtain an intermediate curve between line and logarithmic curves.

DEFORMED EXAMPLE OF FOURTH EMBODIMENT

Figure 20:
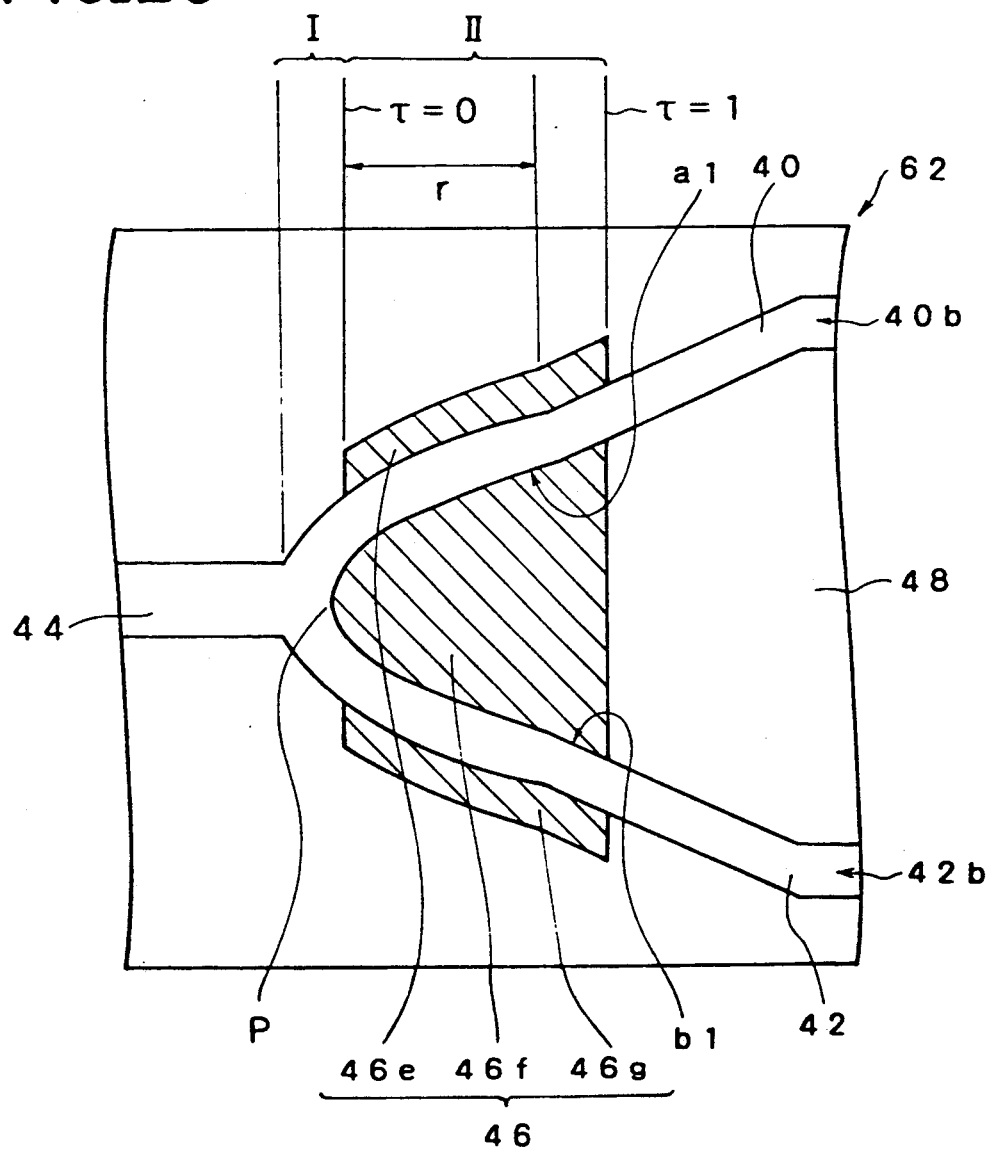
FIG. 20 is a fragmentary plan view schematically showing the construction of a modification of the fourth embodiment of the invention.

FIG. 20 is a plan view schematically showing the constitution of deformed example of the above-mentioned fourth embodiment. In this deformed example of a waveguide type optical switch 62, for example, X-cut LiNbO$_3$ is used as a substrate 48, and an electrode 46 comprises electrode members 46e, 46f and 46g. The electrode member 46e is arranged beside the waveguide route 40 on the remote side of waveguide route 42. The electrode member 46f is arranged between waveguide routes 40 and 42, and the electrode member 46g is arranged beside the waveguide route 42 on the remote side of waveguide route 40. As in the above, the electrode structure can be changed suitably to match the substrate substance or material optionally.

FIFTH EMBODIMENT

Figure 21:
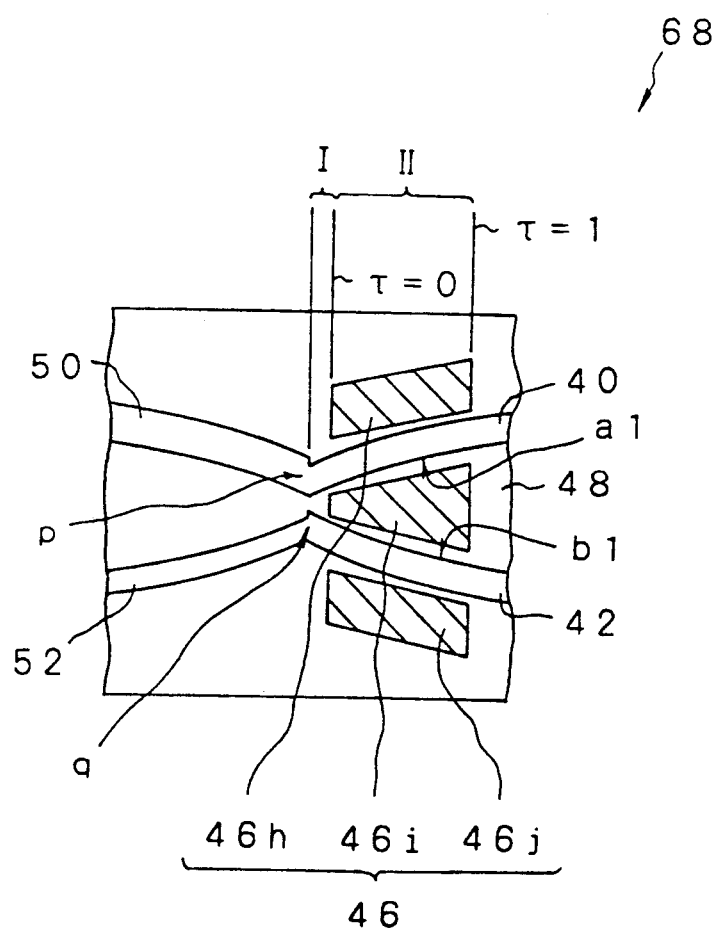
FIG. 21 is a fragmentary plan view schematically showing the construction of the fifth embodiment of the invention.

FIG. 21 is a plan view schematically showing the structure of a fifth embodiment of this invention. The same symbols are given to the constructional components corresponding to the above-mentioned ones shown in FIGS. 14 and 20.

An optical switch 68 of the fifth embodiment is provided with waveguide routes 40, 42, 50 and 52 forming an X-branch, and an electrode 46 comprising electrode members 46h, 46i and 46j.

The waveguide routes 40 and 42 are set, from end to end, as logarithmic type branched waveguide routes expressed by the above-mentioned formula (22), and similarly, the waveguide routes 50 and 52 are set, from end to end, as logarithmic type branched waveguide route expressed by the above mentioned formula (22).

The waveguide routes 40 and 42 have equal widths. The one end part of the waveguide route 50 having a route wider than that of waveguide route 40 is connected to the one end part thereof. The one end part of the waveguide route 52 having a route narrower than that of waveguide route 42 is connected to one end part thereof. In FIG. 21, symbol q denotes the connection part of waveguide routes 42 and 52, and symbol p denotes the connection part of waveguide routes 40 and 50. The connecting parts p and q are separated from each other.

The electrode member 46h is located beside the waveguide route 40 on the side more remote from the waveguide route 42. The electrode member 46i is arranged between the waveguide routes 40 and 42. The electrode member 46j is located beside the waveguide route 42 on the side more remote from waveguide route 40. These electrode members 46h and 46j extend along the whole bending portion II as indicated in FIG. 21.

Next, the operation of an optical switch 68 in this fifth embodiment is briefly explained. With optical input to the waveguide 50, even mode optical excitation occurs on the waveguide 50, and this even mode equally divided on its power at the connecting portions p and q. Even mode rays with equal power are input to the waveguide routes 40 and 42 at the branch part I. In this case, voltage is applied to the electrode 46 to induce a difference of the refractive index between the bending portions II of waveguide routes 40 and 42, thereby to output from the waveguide route of higher refractive index and not to output from the waveguide route of lower refractive index.

The optical input to the waveguide route 52 excites the odd mode which power are equally divided at the connecting portions p and q. The odd mode rays with equal power are input to the waveguide routes 40 and 42 at the branch part I. In this case, voltage is input (applied) to the electrode 46 to cause the difference of refractive index between bending portions II of waveguide routes 40 and 42, by which odd mode ray can be output from the waveguide route of lower refractive index but not output from the waveguide route of higher refractive index.

The optical input to the waveguide route 50 or 52 induces the reverse process of Y-branch, thereby to excite the odd mode or even mode having the field distribution (or optical power strength distribution) with equal division of the power at the connecting portions, that is, coupling portion p and q.

Figure 22:
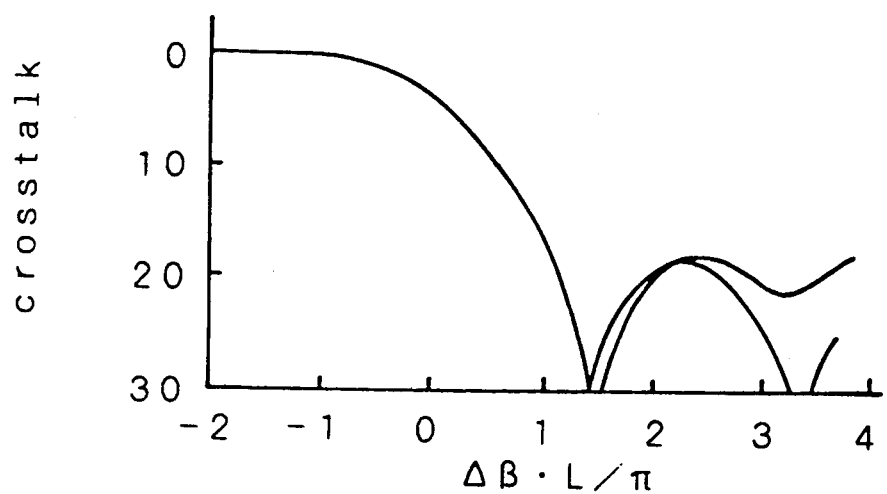
FIG. 22 is a view showing an example of crosstalk characteristics in the fifth embodiment of the invention.

FIG. 22 shows one example of the analyzed result on crosstalk characteristics of this embodiment. The width of waveguide routes 40 and 42 at the bending portions II may be widened or narrowed more than the width of waveguide routes 40 and 42 at other parts than the bending portions II.

This invention is not restricted to the above-mentioned embodiments, thus, optional and suitable changes can be made for the shape, dimension, arranging position, numerical conditions and other conditions of various factors and components of the structures.

In the above embodiment, LiNbO$_3$ was used as a substrate. However, it is also possible to use other suitable well-known ferroelectric materials or well-known semiconductor materials. Further, the waveguide route may be formed suitably depending on the substrate material used such that the refractive index varies electrically. Further, the electrode shape (in a plan view) may be selected suitably depending on the substrate material or substance. The substrate material or substance may be Au or other suitable conductive substances. Where semiconductor material(s) or substance(s) are used for the substrate, it is necessary to provide grounding electrodes on the substrate surface on the side thereof opposite the waveguide routes.

As clarified by the foregoing descriptions, according to a waveguide type optical switch of this invention, a bending portion is provided at each part of the branched two waveguide routes, thus, local branch angle (or opening angle) therebetween is enlarged on the starting side of the bending portion, while the local branch angle is reduced between two waveguide routes on the side of finishing end side of the bending portions. Then, the following effects i) and ii) can be achieved.

i) Comparing the instant optical switch with a conventional one under a same drive voltage, crosstalk characteristics suitable for practical uses can be realized at shorter device-length in the instant optical switch than that in the conventional one. If the device-length were held constant, the crosstalk characteristics suitable for practical uses can be attained at a lower drive voltage in the instant optical switch than that in the conventional one.

ii) Crosstalk characteristics suitable for practical uses can be realized through a wider range of drive voltage in the invented device than in a conventional one.

What is claimed is:

1. A waveguide-type optical switch (10; 60; 62; 64; 66; 68) comprising:

a substrate (20; 40; 48);

branched first and second waveguide routes (12, 14; 40, 42) located on said substrate and having a branch point (P) and a terminal end;

an electrode arrangement (16; 46) located on the substrate for controlling a propagation-constant difference or refractive index difference between the first and second waveguide routes;

wherein the separation between the first and second waveguide routes is extended towards the terminal end (12b, 14b; 40b, 42b) from the branch point (P);

wherein the first and second waveguide routes include a branch part (I);

the first and second waveguide routes each including a respective bending position (II) connected to the branch part; and wherein a local branch angle between the first and second waveguide routes at starting ends (Z=0; τ=0) of the bending portions (II) is larger than the local branch angle between the first and second waveguide routes at terminal ends (Z=L; τ=1) of said bending portions (II).

2. The waveguide-type optical switch as claimed in claim 1, wherein the local branch angle at the bending portion (II) gradually reduces from the starting end to the terminal end of the bending portion.

3. The waveguide-type optical switch as claimed in claim 1, wherein in plan view the bending portion (II) bends bending smoothly.

4. The waveguide-type optical switch as claimed in claim 1, wherein in plan view the bending portion (II) includes a plurality of straight waveguide route members wherein said members are coupled sequentially.

5. The waveguide-type optical switch as claimed in claim 1, wherein the bending portions (II) of the first and second waveguide routes (12, 14; 40, 42) preserves the normal mode between a terminal end (Z=0) of each branch part (I) edge and the terminal end (Z=L) of each bending portion (II).

6. The waveguide-type optical switch as claimed in claim 1, wherein the branch part (I) of the first and second waveguide routes (12, 14; 40, 42) is configured for equally dividing the optical power of normal mode into said first and second waveguide routes; and wherein each bending portion (II) of the first and second waveguide routes is effective for concentrating the equally divided normal mode optical power to either the first or the second waveguide route.

7. The waveguide-type optical switch as claimed in claim 1, wherein each bending portion (II) of the first and second waveguide routes (12, 14; 40, 42) is opposed to the electrode arrangement (16: 16a, 16b, 16c; 46: 46a–46j).

8. The waveguide-type optical switch as claimed in claim 1, wherein the electrode arrangement includes (16; 46) first, second and third electrode members (16a, 16b, 16c; 46e, 46f, 46g; 46h, 46i, 46j) each in a respective, distinct location;

the first electrode member (16a; 46e; 46h) being located beside the first waveguide route (12; 40) on the side thereof more remote from the second waveguide route (14; 42);

the second electrode member (16b; 46f; 46i) being provided between the first and second waveguide routes (12, 14; 40, 42); and the third electrode member (16c; 46g; 46j) being located beside the second waveguide route (14; 42) on the side thereof more remote from the first waveguide route (12; 40).

9. The waveguide-type optical switch as claimed in claim 1, wherein a center line of the first waveguide route (12; 40) is symmetric with a center line of the second waveguide route (14; 42) with respect to a straight axis.

10. The waveguide-type optical switch as claimed in claim 9, wherein the branch part (I) is symmetric with respect to the straight axis.

11. The waveguide-type optical switch as claimed in claim 9, wherein the starting ends of the first, second and third electrode members (16a, 16b, 16c; 46e, 46f, 46g; 46h, 46i, 46j) and of the bending portion (II) lie on or are aligned with a first position on the straight axis, and the terminal ends of the first, second and third electrode members (16a, 16b, 16c; 46c, 46f, 46g; 46h, 46i, 46j) and of the bending portion (II) lie on or are aligned with a second position on the straight axis.

12. The waveguide-type optical switch as claimed in claim 1, wherein the bending portions (II) of the first and second waveguide routes (12, 14; 40, 42) are separated from each other by such a distance that when a voltage is applied to the electrode arrangement (16; 46) to operate the optical switch (10; 60; 62; 64; 66; 68), the optical strength distribution (or field distribution) exists at the terminal end part of a selected one of the ending portions (II) of the first and second waveguide routes (12, 14; 40, 42) and not at the other bending portion.

13. The waveguide-type optical switch as claimed in claim 9, wherein the following formula is established when a specified separation between the opposed inside edges (a1, b1) of the first and second waveguide routes (12, 14; 40, 42) is expressed as "ω", and a distance in positive direction to the bending side from the branch side along the straight axis is expressed as "Z", $$\omega = S \cdot (D - D_0)$$

where

S is a parameter showing an optical amount exuded or emitted from the first and second waveguide routes (12, 14; 40, 42) and naturally determined by the sectional shape of their waveguide routes;

"D" is the distance measured normal to the Z-axis between inside edges of the first and second waveguide routes;

"$D_0$" is distance of "D" at the starting end of the bending portion; and each specified local branch angle $d\omega/dZ$ of the inside edges (a1, b1) is given as $d\omega/dZ = S \cdot dD/dZ$.

14. The waveguide-type optical switch as claimed in claim 9, wherein the following formula can be established when a distance in positive direction on the bending side from the branch side along the straight axis is expressed as "Z", the starting end of bending portion (II) is expressed as Z=0, the terminal end of the bending portion (II) is expressed as Z=L, and a specified interval between the opposed inside edges (a1, b1) of the first and second waveguide routes (12, 14; 40, 42) is expressed as "ω", $$\omega = a \cdot (Z + Z_0)^n$$

where a and n are parameters indicating the plane shape of the first and second waveguide routes (12, 14; 40, 42) and positive, and $0 < n < 1$;

$Z_0$ is a parameter indicating the maximum local branch angle; and
each specified local branch angle $d\omega/dZ$ of the inside edges (a1, b1) is given as $$d\omega/dZ = n \cdot a \cdot (Z + Z_0)^{n-1}.$$

15. The waveguide-type optical switch as claimed in claim 14, wherein the following relation is established at $Z=0$:

$$0 < d\omega/dZ < \pi/90.$$

16. The waveguide-type optical switch as claimed in claim 14, wherein the following formula is established:

$$\frac{2 \cdot K(Z)}{d\omega/dZ} > 0.43$$

where $K(Z)$ is a coupling coefficient between the first and second waveguide routes (12, 14) at distance $Z$.

17. The waveguide-type optical switch as claimed in claim 1, wherein the waveguide-type optical switch has a Y-branched type waveguide route structure comprising an input side waveguide route (18; 44); said first and second waveguide routes (12, 14) branching therefrom.

18. The waveguide-type optical switch as claimed in claim 1, wherein the waveguide-type optical switch (66) has an X-branched type waveguide route structure comprising straight advancing waveguide first and second routes (22, 24);
said first straight advancing waveguide route (22) including a first input-side waveguide route (28) and a first waveguide route (14);
said second straight advancing waveguide route (24) including a second input-side waveguide route (26) and a second waveguide route (12).

19. The waveguide-type optical switch as claimed in claim 18, wherein said second input-side waveguide route (26) has a thinner width than that of the first input-side waveguide route (28).

20. The waveguide-type optical switch as claimed in claim 1, wherein an electrode length of the electrode arrangement (46) is expressed as "L";
a specified distance specified by the electrode length "L" for the distance measured from the starting end of the bending portion (II) toward the terminal end side thereof along an axis is expressed as "$\tau$", with respect to which axis a center line of the first waveguide route (40) is symmetric with a center line of the second waveguide route (42); and
the local branch angle at the bending portion (II) is maximum at $\tau=0$ and gradually becomes smaller from $\tau=0$ towards $\tau=r$ ($0<r<1$), and the local branch angle from $\tau=r$ to $\tau=1$ is smaller than the local branch angle at and around $\tau=0$.

21. The waveguide-type optical switch as claimed in claim 20, wherein the bending portion (II) of each of the first and second waveguide routes (40, 42) comprises a curved waveguide route part ($0<\tau\leq r$) and a straight waveguide part ($r>\tau\leq 1$).

22. The waveguide-type optical switch as claimed in claim 21, wherein the local branch angle at the straight waveguide route part ($r<\tau\leq 1$) is that of the curved waveguide route part ($0<\tau\leq r$) of the bending portion at $\tau=r$.

23. The waveguide-type optical switch as claimed in claim 20, wherein the following formula can be established $$\omega = l_n[(R^{-1}-1)\cdot\tau + 1]$$

$$0 \leq \tau \leq 1$$

where
"$\omega$" is a specified distance between opposing inside edges (a1, b1) of the waveguide route (40, 42), and "R" is the min/max coupling coefficient ratio between the first and second waveguide routes (40, 42).

24. The waveguide-type optical switch as claimed in claim 20, wherein the waveguide route shape of each of the bending portions (II) of the first and second waveguide routes (40, 42) is shaped so that a distance "D" between inside edges (a1, b1) of the waveguide routes (40, 42) measured in the direction normal to the $\tau$ axis increases or enlarges according to a logarithmic function with respect to increasing $\tau$.

25. The waveguide-type optical switch as claimed in claim 2, wherein each of the bending portions (II) of the first and second waveguide routes (40, 42) has a logarithmic type waveguide route shape in a zone from $\tau=0$ to $\tau=r$ ($0<r<1$), and a straight type waveguide route shape in a zone from $\tau=r$ to $\tau=1$.

26. The waveguide-type optical switch as claimed in claim 1, wherein the shape of the first and second waveguide routes (12, 14; 40, 42) has an intermediate waveguide route shape between the straight type waveguide route and logarithmic type waveguide route.

27. The waveguide-type optical switch as claimed in claim 26, wherein the curve form of the first and second waveguide routes (12, 14; 40, 42) is expressed as $$\omega = l_n[(R^{-1}-1)f(\tau)+1]$$

whereas, $$f(\tau) = \{\exp[(-l_n R)e\tau]-1\}/\{\exp[(-l_n R)e]-1\}$$

$$0 \leq e \leq 1$$

$$\tau = Z/L$$

where
"$\omega$" is a specified interval between opposed inside edges (a1, b1) of the first and second waveguide routes (12, 14; 40, 42);
"Z" is a distance measured from the starting end of the bending portion (II) toward the terminal end side thereof along an axis, with respect to which the center line of the first waveguide route (12, 40) is symmetrical with a center line of the second waveguide route (14; 42);
"L" is the length of the electrode(s);
"R" is a min/max coupling coefficient ratio between first and second waveguide routes; and
"e" is a parameter determining the curve form.

28. The waveguide-type optical switch as claimed in claim 26, wherein the curve form of the first and second waveguide routes (12, 14; 40, 42) is expressed as $$\omega = l_n(R^{-1})\{l_n[(R^{-1}-1)e\tau+1]/\{l_n[(R^{-1}-1)e+1]\}$$

wherein, $$0 \leq e \leq 1$$

$$\tau = Z/L$$

where
- "ω" is a specified interval between opposite inside edge (a1, b1) of the first and second waveguide routes (12, 14; 40, 42);
- "Z" is a distance measured from the starting end of the bending portion (II) toward the terminal end side thereof along an axis, with respect to which the center line of the first waveguide route (12, 40) is symmetrical with a center line of the second waveguide route (14; 42);
- "L" is the length of the electrode arrangement;
- "R" is a min/max coupling coefficient ratio between first and second waveguide routes; and
- "e" is a parameter determining the curve form.

29. The waveguide-type optical switch as claimed in claim 1, wherein when "R" designates a min/max coupling coefficient ratio between the first and second waveguide route (12, 14; 40, 42), the following relation is true.

$$0.003 < R < 0.03.$$

30. The waveguide-type optical switch as claimed in claim 1, wherein the width of the first waveguide route (12; 40) is equal to that of the second waveguide route (14; 42).

31. The waveguide-type optical switch as claimed in claim 1, wherein:
- the waveguide-type optical switch (68) includes an X-branched waveguide structure comprising one waveguide route which includes said first waveguide route and another waveguide route which includes said second waveguide route;
- the one waveguide route comprises a first input route (50) connected to said first waveguide route (40);
- the other waveguide route comprises a second input route (52) connected to said second waveguide route (42);
- the width of the first input route (50) is wider than the width of the second input route (52); and
- the one and the other waveguide routes extend over the whole length of the device and are located proximate to one another at respective parts connecting the first and second input routes (50, 52) with the first and second waveguide routes (40, 42), respectively.

32. An optical waveguide switching device comprising:
- a waveguide having first and second waveguide routes on a substrate, the routes having a branching angle between them, having a bending portion, and having a starting end where light may enter and a terminal end from which light may pass; and
- electrodes located proximate to the first and second waveguide routes to affect the light travelling from the starting end to the terminal end;
- said branching angle being enlarged at the starting end and reducing through the bending portion toward the terminal end, whereby crosstalk characteristics are improved at a lowered drive voltage of the electrodes.

33. The device of claim 32 wherein said first and second routes are configured to preserve the normal mode therein.

34. The device of claim 32 wherein said first route is symmetric with said second route with respect to an axis through the device.

35. The device of claim 32 wherein said electrodes are located within the device and include:
- a central electrode located between said first and second routes, and
- first and second spaced apart lateral electrodes,
- said first route passing between the first electrode and the central electrode, the second route located between the second electrode and the central electrode.

36. The device of claim 35 wherein said waveguide and routes form a Y-branch structure.

37. The device of claim 35 wherein said waveguide and routes form an X-branch structure.

38. The device of claim 37 wherein the first and second waveguide routes include respective portions that are unequal in width on one side of the branching angle.

39. The device of claim 38 wherein said waveguide route portions are arcuate.

40. The device of claim 38 wherein said waveguide route portions are straight.

41. The device of claim 32 wherein said first and second waveguide routes include sides having a logarithmic curve.

42. The device of claim 41 wherein said first and second routes further include straight sides.

* * * * *